(12) United States Patent
Stafford et al.

(10) Patent No.: US 10,795,731 B2
(45) Date of Patent: *Oct. 6, 2020

(54) SYSTEMS AND METHODS FOR DISTRIBUTED RESOURCE MANAGEMENT

(71) Applicant: 10X Genomics, Inc., Pleasanton, CA (US)

(72) Inventors: David Luther Alan Stafford, San Francisco, CA (US); Adam David Azarchs, San Mateo, CA (US); Alexander Y. Wong, San Francisco, CA (US)

(73) Assignee: 10X Genomics, Inc., Pleasanton, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/566,199

(22) Filed: Sep. 10, 2019

(65) Prior Publication Data
US 2020/0159588 A1 May 21, 2020

Related U.S. Application Data

(63) Continuation of application No. 16/209,849, filed on Dec. 4, 2018, now Pat. No. 10,452,448, which is a (Continued)

(51) Int. Cl.
*G06F 9/50* (2006.01)
*H04L 29/08* (2006.01)

(52) U.S. Cl.
CPC .......... *G06F 9/5038* (2013.01); *G06F 9/5016* (2013.01); *G06F 9/5061* (2013.01);
(Continued)

(58) Field of Classification Search
CPC ..... H04L 29/08135–0827; H04L 67/10–1031; G06F 9/50–5094
See application file for complete search history.

(56) References Cited

U.S. PATENT DOCUMENTS 6,463,457 B1 10/2002 Armentrout et al.
8,230,426 B2 7/2012 Powers et al.
(Continued)

OTHER PUBLICATIONS

"Beginner's Guide to Sun Grid Engine 6.2: Installation and Configuration," Sep. 2008, Sun Microsystems, Inc.
(Continued)

*Primary Examiner* — Brendan Y Higa
(74) *Attorney, Agent, or Firm* — Morgan, Lewis & Bockius LLP

(57) ABSTRACT

Methods, nontransitory computer readable media, and systems are disclosed for servicing a job queue. Each job has node resource requirements. Composite job memory and processor requirements is determined from these requirements. Nodes that satisfy these requirements are identified by obtaining, for each class of a plurality of node classes: an availability score, a number of processors, and a memory capability. A request for nodes of a class is made when a demand score for the class satisfies the class availability score. An acknowledgement and updated availability score is received upon request acceptance. A declination is received upon request rejection. The submitting and receiving is performing multiple times, if needed, until each class has been considered for a request or sufficient acknowledgements are received to satisfy the composite requirements of the jobs. Each node in the cluster draws jobs from the queue subject to the collective requirements of the drawn jobs.

20 Claims, 19 Drawing Sheets

Related U.S. Application Data continuation of application No. 15/928,958, filed on Mar. 22, 2018, now Pat. No. 10,162,678, which is a continuation-in-part of application No. 15/677,294, filed on Aug. 15, 2017, now Pat. No. 9,946,577.

(60) Provisional application No. 62/545,034, filed on Aug. 14, 2017.

(52) U.S. Cl.
CPC .......... G06F 9/5077 (2013.01); G06F 9/5083 (2013.01); H04L 29/0827 (2013.01); H04L 29/08135 (2013.01); H04L 29/08189 (2013.01); H04L 67/10 (2013.01); H04L 67/1012 (2013.01); H04L 67/1031 (2013.01); H04L 67/32 (2013.01); *G06F 2209/501* (2013.01); *G06F 2209/505* (2013.01); *G06F 2209/506* (2013.01); *G06F 2209/5013* (2013.01)

(56) References Cited

U.S. PATENT DOCUMENTS

| | | | |
|---|---|---|---|
| 8,412,822 B1 | 4/2013 | Weinman | |
| 8,706,798 B1 | 4/2014 | Suchter et al. | |
| 8,843,929 B1 | 9/2014 | Oppenheimer et al. | |
| 9,239,711 B1* | 1/2016 | Mistry | G06F 9/5072 |
| 9,389,916 B1 | 7/2016 | Miller et al. | |
| 9,672,064 B2 | 6/2017 | Gupta et al. | |
| 9,740,526 B2 | 8/2017 | Majewski et al. | |
| 9,910,708 B2* | 3/2018 | Williamson | G06F 9/5027 |
| 2005/0071843 A1 | 3/2005 | Guo et al. | |
| 2010/0058349 A1 | 3/2010 | Diwakar et al. | |
| 2010/0153965 A1 | 6/2010 | Arimilli et al. | |
| 2011/0154358 A1 | 6/2011 | Di Balsamo et al. | |
| 2013/0104140 A1 | 4/2013 | Meng et al. | |
| 2013/0346994 A1 | 12/2013 | Chen et al. | |
| 2014/0025822 A1 | 1/2014 | Guha et al. | |
| 2014/0109104 A1 | 4/2014 | Majewski et al. | |
| 2014/0208327 A1 | 7/2014 | Cadambi et al. | |
| 2014/0237477 A1 | 8/2014 | Cadambi et al. | |
| 2015/0150017 A1 | 5/2015 | Hu et al. | |
| 2016/0350146 A1 | 12/2016 | Udupi et al. | |
| 2017/0302586 A1 | 10/2017 | Suchter et al. | |

OTHER PUBLICATIONS

Pascual et al., 2009, "Job Scheduling Strategies for Parallel Processing," Lecture Notes in Computer Science, 5798: 138-144. ISBN 978-3-642-04632-2. doi:10.1007/978-3-642-04633-9_8.

* cited by examiner

FIG. 4F

```
                                                                    544
┌──────────────────────────────────────────────────────────────────┐
│ Grant each respective node 282 in the cluster 110 of nodes with a draw privilege. │
│ The draw privilege permits a respective node 282 to draw one or more jobs from the │
│ queue 248 during the first epic 274 subject to a constraint that the collective │
│ computer memory requirements and processing core requirements of the one or │
│ more jobs collectively drawn by a respective node in the cluster of nodes does not │
│ exceed a number of reservable processing cores and a reservable memory capability │
│ of the respective node 282. A first node 282 in the cluster of nodes draws more than │
│ one job from the queue 248 for concurrent execution on the first node 282 during the │
│ first epic 274.                                                      ├─546
│ ┌──────────────────────────────────────────────────────────────┐ │
│ │ A respective node 282 in the cluster that has the draw privilege draws a job from │ │
│ │ the queue when the respective node 282 has an availability of reservable memory │ │
│ │ and reservable processing cores by reserving the job in the queue with the oldest │ │
│ │ timestamp subject to the constraint that the job can be handled by the available │ │
│ │ reservable memory and reservable processing cores of the respective node 282.  │ │
│ └──────────────────────────────────────────────────────────────┘ │
└──────────────────────────────────────────────────────────────────┘
```

Grant each respective node 282 in the cluster 110 of nodes with a draw privilege. The draw privilege permits a respective node 282 to draw one or more jobs from the queue 248 during the first epic 274 subject to a constraint that the collective computer memory requirements and processing core requirements of the one or more jobs collectively drawn by a respective node in the cluster of nodes does not exceed a number of reservable processing cores and a reservable memory capability of the respective node 282. A first node 282 in the cluster of nodes draws more than one job from the queue 248 for concurrent execution on the first node 282 during the first epic 274. — 544

A respective node 282 in the cluster that has the draw privilege draws a job from the queue when the respective node 282 has an availability of reservable memory and reservable processing cores by reserving the job in the queue with the oldest timestamp subject to the constraint that the job can be handled by the available reservable memory and reservable processing cores of the respective node 282. — 546

Each respective job in the first plurality of jobs is associated with an originating user identifier. The method further comprises associating the originating user of a first job in the first plurality of jobs with all or a portion of the updated current availability score 304 or list price 305 of the node class 284 of the respective node 282 that draws the first job in the first plurality of jobs. — 548

The first job reserves an entirety of the reservable memory or an entirety of the reservable processing cores of the respective node 282 and the associating associates the originating user with all of the updated current availability score 304 or list price 305 of the node class 284 of the respective node 282. — 550

The first job reserves a fraction of the reservable memory or a fraction of the reservable processing cores of the respective node 282 and the associating associates the originating user with a corresponding fraction of the updated currently availability score or list price 305 of the node class 284 of the respective node 282. — 552

For a second epic 274 in the plurality of epics occurring immediately after the first epic 274: responsive to identifying fewer jobs in the queue 248 than can be serviced by the cluster, terminating a privilege of one or more nodes 282 in the cluster to draw further jobs from the queue 248. — 554

For a second epic 274 in the plurality of epics occurring before the first epic 274: obtain an updated availability score for each node class 284 for nodes in the cluster; and responsive to determining that the updated current availability score 304 for a respective node class 284 exceeds a first limiter, terminating a privilege of each node in the cluster of the respective node class to draw jobs from the queue. — 556

Responsive to determining that the updated current availability score 304 for a respective node class exceeds a second limiter, immediately terminating each node in the cluster of the respective node class 284 from the cluster. — 558

FIG. 5D

Display a summary of the node cluster 110 during the first epic. The node summary specifies, for each respective node 282 in the node cluster, how many jobs drawn from the queue 248 that the respective node is presently executing. ⟵ 560

The memory comprises a pending jobs directory, and the method further comprises writing a job definition file in the pending jobs directory for each respective job in the queue 248. ⟵ 562

The memory comprises a succeeded jobs directory. The method further comprises moving the corresponding job definition file of each respective job that has been completed by a node 282 in the cluster 110 to the succeeded jobs directory. ⟵ 564

The memory comprises a failed jobs directory. The method further comprises moving the corresponding job definition file of each respective job that has been initiated but unsuccessfully completed by the cluster to the failed jobs directory and writing a corresponding error report for the respective job to the failed jobs directory. ⟵ 566

The adding further comprises: creating a respective host directory for each respective node 282 in the first plurality of nodes thereby creating a plurality of host directories, and writing a corresponding node status file in the corresponding host directory for each respective node in the first plurality of nodes. The method further comprises: updating a status of each respective node in the cluster by updating the node status file corresponding to the respective node based upon a status received from the respective node and moving the job definition file of a job in the queue 248 from the pending jobs directory to the host directory corresponding to a respective node in the cluster when the respective node draws the job from the queue 248. ⟵ 568

The adding further comprises: creating a respective host directory 320 for each respective node 282 in the first plurality of nodes thereby creating a plurality of host directories, and writing a corresponding node status file 322 in the corresponding host directory for each respective node in the first plurality of nodes. The method further comprises: updating a status of each respective node in the cluster 110 by updating the node status file 322 corresponding to the respective node 282 based upon a status received from the respective node 282 and moving the job definition file 250 of a job in the queue 248 from the pending jobs directory to the host directory corresponding to a respective node in the cluster when the respective node 282 draws the job 250 from the queue 248. ⟵ 570

The memory further comprises a failed jobs directory. The method further comprises: responsive to determining that a respective node in the cluster has failed to update its status in the node status file corresponding to the respective node within a second time-out period, moving the job definition file of each respective job that is in the host directory corresponding to the respective node into the failed jobs directory; and removing the respective node from the cluster. ⟵ 572

FIG. 5E

```
                                    ┌─ 562 Cont.
                                    │ 568
                                    │ Cont.
                                    │ 574
```

The status comprises any combination of a state of the corresponding node, a timestamp, a remaining number of reservable number of processing cores that is currently available on the corresponding node, a remaining amount of reservable memory that is currently available on the corresponding node, a total number of reservable number of processing cores that is available on the corresponding node, a total amount of reservable memory that is available on the corresponding node, and an instance identifier for the respective node.

— 576

The cluster is configurable between a permissive status and a non-permissive status. When the cluster is in the permissive status, the adding is permitted. When the cluster is in the non-permissive status, the adding is not permitted. When the cluster is in the non-permissive status and a first job in the queue 248 has been in the queue 248 for more than a predetermined amount of time, the method further comprises: moving the job definition file of the first job in the queue 248 from the pending jobs directory to the host directory corresponding to a respective node in the cluster that is most likely able to handle the first job first; and revoking the draw privilege of the respective node until the respective node has completed the first job.

— 578

Responsive to determining that the cluster does not include a node that has a sufficient amount of reservable memory or a sufficient amount of reservable processing cores to handle a first job in the queue 248 that requires the greatest amount of memory or the most number of processing cores: submitting a request for a node that has sufficient amount of reservable memory or a sufficient amount of reservable processing cores to handle the first job; and adding the node to the cluster 110.

— 580

The cluster is configurable between a permissive status and a non-permissive status. The method further comprises obtaining, on a recurring basis, for each respective node in the cluster, a current availability score 304 or list price 305 of the respective node; computing, on the recurring basis, a total availability score for the cluster as a summation of each respective current availability score 304 of each node in the cluster; and allowing the cluster to be in the permissive status when the total availability score is less than a first predetermined limiter, and requiring the cluster to be in the non-permissive status when the total availability score exceeds the first predetermined limiter. When the cluster is in the permissive status, the adding is permitted. When the cluster is in the non-permissive status, the adding is not permitted.

FIG. 5F

- Root
  - Node configuration state file
  - Job backing store
  - Pending jobs directory —248
    - Job definitions
  - Archive
    - Succeeded jobs —290
      - Job result directories
        - Job definition
        - Job statistics
    - Failed jobs —294
      - Job result directories
        - Job definition —250
        - Job statistics
        - Job error report —320
    - Archived host directory
  - Hosts —110
    - Host directories —320
      - Host status and configuration file —322
      - Host performance monitoring log
      - Host error log
      - Claimed work directory
        - Job definitions —250
      - Running work
        - Job directories
          - Job definition —250
          - Job statistics

FIG. 7

SYSTEMS AND METHODS FOR DISTRIBUTED RESOURCE MANAGEMENT

CROSS REFERENCE TO RELATED APPLICATION

This application claims priority to U.S. patent application Ser. No. 16/209,849, filed Dec. 4, 2018, entitled SYSTEMS AND METHODS FOR DISTRIBUTED RESOURCE MANAGEMENT, which claims priority to U.S. Pat. No. 10,162,678, entitled SYSTEMS AND METHODS FOR DISTRIBUTED RESOURCE MANAGEMENT, which is a continuation-in-part of U.S. Pat. No. 9,946,577, entitled SYSTEMS AND METHODS FOR DISTRIBUTED RESOURCE MANAGEMENT, which, in turn, claims priority to U.S. Provisional Patent Application No. 62/545,034, entitled SYSTEMS AND METHODS FOR DISTRIBUTED RESOURCE MANAGEMENT, filed Aug. 14, 2017, each of which is hereby incorporated by reference herein in its entirety.

TECHNICAL FIELD

The disclosed implementations relate generally to improved systems and methods for distributed resource management of computationally intensive or memory intensive tasks.

BACKGROUND

Distributed resource management tools such as the Sun Grid Engine ("SGE") and Slurm enable higher utilization, better workload throughput, and higher end-user productivity from existing compute resources. See, Templeton, 2008, "Beginner's Guide to Sun Grid Engine 6.2," White Paper; and Pascual et al., 2009, "Job Scheduling Strategies for Parallel Processing," Lecture Notes in Computer Science, 5798: 138-144. ISBN 978-3-642-04632-2. doi:10.1007/978-3-642-04633-9_8. For instance, SGE transparently selects the resources that are best suited for each segment of work, and distributes the workload across a resource pool while shielding end users from the inner working of the compute cluster. First, it allocates exclusive and/or non-exclusive access to resources (computer nodes) to users for some duration of time so they can perform work. Second, it provides a framework for starting, executing, and monitoring work (typically a parallel job) on a set of allocated nodes. Finally, it arbitrates contention for resources by managing a queue of pending jobs. Similarly, SLURM (i) provides exclusive and/or non-exclusive access to resources (computer nodes) to users for some duration of time so they can perform work, (ii) provides a framework for starting, executing, and monitoring work (typically a parallel job) on a set of allocated nodes, and (iii) arbitrates contention for resources by managing a queue of pending jobs.

Thus, central to such distributed schedulers is that users, who have computational jobs to be performed, represented by script, submit their scripts to the distributed scheduler, such as SGE or SLURM, and the scheduler finds a computer in a network that is available to run the computational job.

A drawback with such conventional schedulers is that they were developed prior to cloud computing. One aspect of cloud computing is that the network that is available to run a computational job is dynamic. When computational resources are not required, end users do not need to pay for them. In other words, rather than being a fixed size, the available cluster of computing resources can be scaled up or down on a dynamic basis as a function of current computational need. Conventional schedulers do not satisfactorily handle this dynamic element of cloud computing. For instance, if SGE is applied to a cloud based computing network and one of the computers in the network disappears (because the network is being scaled down due to current decreased computational demand), SGE does not handle the situation satisfactorily.

With the advent of cloud computing, operations groups running distributed computing jobs expect to be able to add and renew resources to clusters without having to restart nodes. However, such a feature is not satisfactorily supported by conventional distributed computing schedulers.

Moreover, sole reliance on cloud based solutions for distributed scheduling of computing jobs has drawbacks, particularly in instances where the distributed computational jobs require breaking a dataset into tens, hundreds, or thousands of chunks that are each processed on independent CPU cores using algorithms that takes the independent CPU cores minutes, tens of minutes or hours to complete. For instance, some cloud based solutions, such as AWS batch, spin up an entire virtual node for each such chunk. See *the Internet*, at aws.amazon.com/blogs/aws/aws-batch-run-batch-computing-jobs-on-aws. This results in a two- to five-minute overhead per submitted job, and thus substantially reduces the efficiency of short jobs. It also reduces efficiency of jobs which do not perfectly fit the memory or processor availability of the computer they are run on. Another cloud based solution is AMAZON WEB SERVICES' (AWS) EC2 Spot Instances. See the Internet at aws.amazon.com/ec2/spot/. AWS EC2 Spot Instances is a real-time (second price) auction where customers (or software running on behalf of customers) submit electronic bids for computers. The bid is active, and customer get access to the computer and is charged for it, until the customer gives up the computer or someone else offers a higher bid. Like on demand instances provided by AWS, the customer can select a pre-configured or custom Amazon Machine Image (AMI), configure security and network access to their Spot instance, choose from multiple instance types and locations, use static IP endpoints, and attach persistent block storage to their Spot instances. Similarly, the customer can pay for each instance by the hour with no up-front commitments. Other cloud based solutions, such as AWS Lamda, are designed to work with small computing projects. See the Internet, at aws.amazon.com/lambda/. AWS Lambda is not optimized for larger jobs that run for longer, such as a pipeline that requires 30 CPU cores for several hours. Additionally, such cloud based solutions have the drawback of supporting only some programming languages, such as Node.js, Java, Ruby, C #, Go, Python, or PHP, while offering unsatisfactory support, no support, or outright prohibiting other programming languages. If cloud based solutions did not time out, provided ample memory support for each chunk, did not spin-up a complete virtual node for each chunk, imposed no restrictions on which programming languages can be used, and did all this in a cost effective manner, then distributed scheduling solutions may not be necessary. However, in practice, cloud based solutions do have the above-identified drawbacks. Accordingly, improved distributed scheduling, even in the context of cloud computing resources, is necessary in order to ensure that each job has the proper resources and is being run as economically as practically possible.

Given these circumstances, what is needed in the art are improved distributed scheduling tools that can handle the dynamic environment of cloud based computing, where resources in the computing network emerge and disappear on a dynamic basis.

SUMMARY

The present disclosure addresses the above-identified need in the art by providing systems and methods for distributed resource management of computationally intensive or memory intensive tasks.

One aspect of the present disclosure provides a computing system comprising one or more processors and a memory. The memory stores one or more programs for execution by the one or more processors. The one or more programs singularly or collectively comprise instructions for executing a method. The method comprises, for a first epic in a plurality of epics, identifying a first plurality of jobs in a queue. Each respective job in the first plurality of jobs is associated with a timestamp that indicates when the respective job was submitted to the queue and specifies one or more node resource requirements. The method further comprises determining a composite computer memory requirement and a composite processing core requirement, for the first plurality of jobs, from the one or more node resource requirements of each job in the first plurality of jobs.

In some embodiments, these composite requirements are determined when a difference between the timestamp of an oldest job in the queue and the onset of the first epic exceeds a time threshold.

The method further comprises identifying a first one or more nodes to add to a cluster during the first epic to satisfy at least a subset of the composite computer memory requirement and/or the composite processing core requirement. In some embodiments, this identifying comprises (i) obtaining, for each respective node class in a first plurality of node classes: (a) a current availability score, (b) a reservable number of processing cores, and (c) a reservable memory capability of the respective node class. In other words, for each respective node class, the current availability score of the node class (e.g., asking price per hour for a node of the node class), the number of processing cores that may be used when reserving a node of the respective node class, and the amount of RAM memory that is made available to the user of the node of the respective node class. Then, a request is submitted for one or more nodes of a corresponding node class in the first plurality of node classes when a demand score (e.g., bidding price) for the corresponding node class satisfies the current availability score for the corresponding node class by a first threshold amount.

In the method, a response to the request is received. The response includes an acknowledgement and updated current availability score for the respective node class when the request for the one or more nodes of the corresponding node class is accepted. The response includes a declination when the request for the one or more nodes of the corresponding node class is rejected.

In this way, a first one or more nodes to be added to the cluster of nodes during the first epic is identified.

The method continues by adding the first one or more nodes to the cluster of nodes during the first epic.

Each respective node in the cluster of nodes is granted a draw privilege. The draw privilege permits a respective node to draw one or more jobs from the queue during the first epic subject to a constraint that the collective computer memory requirements and processing core requirements of the one or more jobs collectively drawn by a respective node in the cluster of nodes does not exceed a number of reservable processing cores and a reservable memory capability of the respective node.

In the disclosed methods, a first node in the cluster of nodes draws more than one job from the queue for concurrent execution on the first node during the first epic. In some embodiments, other nodes in the cluster of nodes may draw a single job, or concurrently draw multiple jobs from the queue for execution.

In some embodiments, the process of identifying suitable node classes further comprises repeating, or performing concurrently, additional instances of the submitting of requests and receiving responses until a first occurrence of (a) each node class in the first plurality of node classes being considered for a request or (b) receiving a sufficient number of acknowledgements to collectively satisfy the composite computer memory requirement and the composite processing core requirement of the first plurality of jobs.

In some embodiments, a first job in the first plurality of jobs corresponds to a chunk in a plurality of chunks, the one or more node resource requirements for the first job comprises a computer memory requirement and a number of processing cores requirement, an amount of the computer memory requirement is determined by a size of the chunk, and the number of processing cores requirement is determined by an amount of processing resource needed for processing the chunk.

In some embodiments, each respective job in the first plurality of jobs is associated with an originating user identifier, and the method further comprises associating the originating user of a first job in the first plurality of jobs with all or a portion of the updated current availability score of the node class of the respective node that draws the first job in the first plurality of jobs. In some such embodiments, the first job reserves an entirety of the reservable memory or an entirety of the reservable processing cores of the respective node and the associating associates the originating user with all of the updated current availability score of the node class of the respective node. In alternative embodiments, the first job reserves a fraction of the reservable memory or a fraction of the reservable processing cores of the respective node and the originating user is associated with a corresponding fraction of the updated currently availability score of the node class of the respective node.

In some embodiments, the demand score for a node class is determined by (i) the number of reservable processing cores of the respective node class, and (ii) the reservable memory capability of the respective node class. In some embodiments, the demand score for the respective node class is further determined by a processor performance of a reservable processing core of the respective node class.

In some embodiments, each job in the first plurality of jobs corresponds to a chunk in a plurality of chunks, a dataset that includes the plurality of chunks is associated with a first data center at a first geographic location, the first data center physically houses a first subset of the first plurality of node classes, the demand score for a respective node class is further determined by whether the respective node class is in the first data center or a data center other than the first data center.

In some embodiments, each difference between the respective timestamp of a corresponding job in the first plurality of jobs and the onset of the first epic exceeds a given time threshold. In other words, each of the jobs in the first plurality of jobs has been waiting for at least the given time threshold.

In some embodiments, the demand score for a respective node class in the first plurality of node classes is penalized when the current availability score for the respective node class is within a second threshold amount of an initial demand score for the respective node class. This is because of the likelihood that the current availability score may soon exceed the demand score is unacceptably high when the current availability score for the respective node class is too close to the initial demand score.

In some embodiments, the method further comprises, for a second epic in the plurality of epics occurring immediately after the first epic: responsive to identifying fewer jobs in the queue than can be serviced by the cluster, terminating a privilege of one or more nodes in the cluster to draw further jobs from the queue. In other words, in this second epic, a determination is made that the cluster has excess capacity and so, to reduce costs, one or more nodes should be gracefully removed from the cluster. In some such embodiments, first, the draw privileges of some of the nodes is terminated. Then, as such nodes complete their existing jobs, they are terminated from the cluster.

In some embodiments, the method further comprises, for a second epic in the plurality of epics occurring before the first epic, obtaining an updated current availability score for each node class for one or more nodes in the cluster and, responsive to determining that the updated current availability score for a respective node class exceeds a first limiter, terminating a privilege of each node in the cluster of the respective node class to draw jobs from the queue. In other words, a determination is made that some nodes in the cluster are too expensive because they exceed their corresponding demand score. Consequently, one or more nodes in the queue that exceed their corresponding demand score (the demand score for the corresponding node class) are removed from the cluster. In some such embodiments, first, the draw privileges of these nodes are terminated. Then, as such nodes complete their existing jobs, they are terminated from the cluster.

In some embodiments, responsive to determining that the updated current availability score for a respective node class exceeds a second limiter, each node in the cluster that is a node of the respective node class is immediately terminated from the cluster. In other words, a determination is made that a node class represented by nodes in the cluster is too expensive because they greatly exceed the demand score for the node class. Consequently, one or more nodes in the queue of this node class are immediately removed from the cluster without waiting for these nodes to complete their existing jobs.

In some embodiments, at least one node in the first one or more nodes is a virtual machine.

In some embodiments, the method further comprises rank ordering the first plurality of node classes prior to the submitting requests for nodes of the respective node classes. In some such embodiments the rank ordering occurs through a first procedure that comprises: determining a respective effective availability score for each respective node class in the first plurality of node classes as a function of a ratio of (a) the current availability score for the respective node class and (b) a combination of (i) the reservable number of processing cores for the respective node class and (ii) a likelihood of usefulness of the respective node class, where the likelihood of usefulness is determined by a difference in the current availability score and a demand score for the respective node class, thereby rank ordering the first plurality of node classes into an order. Then, the rank order of the first plurality of node classes is used to determine which node class in the first plurality of node classes to submit the request.

In some embodiments, the first one or more nodes comprises 10 or more nodes, 100 or more nodes, 1000 or more nodes, or 5000 or more nodes.

In some embodiments, the first one or more nodes comprises one or more nodes of a first node class and one or more nodes of a second node class in the plurality of node classes. For instance, in some such embodiments, the first node class is associated with a different number of reservable processing cores or a different amount of reservable memory than the second node class.

In some embodiments, the method further comprises displaying a summary of the node cluster during the first epic, where the node summary specifies, for each respective node in the node cluster, how many jobs drawn from the queue that the respective node is presently executing.

In some embodiments, the memory further comprises a pending jobs directory, and the method further comprises writing a job definition file in the pending jobs directory for each respective job in the queue. In some such embodiments, the memory further comprises a succeeded jobs directory, and the method further comprises moving the corresponding job definition file of each respective job that has been completed by a node in the cluster to the succeeded jobs directory. In some embodiments, the memory further comprises a failed jobs directory and the method further comprises moving the corresponding job definition file of each respective job that has been initiated but unsuccessfully completed by the cluster to the failed jobs directory and writing a corresponding error report for the respective job to the failed jobs directory.

In some embodiments, a respective host directory is created for each respective node in the first one or more nodes thereby creating a one or more host directories, and a corresponding node status file is written in the corresponding host directory for each respective node in the first one or more nodes. In such embodiments, the method further comprises updating a status of each respective node in the cluster by updating the node status file corresponding to the respective node based upon a status received from the respective node. Moreover, the method further comprises moving the job definition file of a job in the queue from the pending jobs directory to the host directory corresponding to a respective node in the cluster when the respective node draws the job from the queue. In some such embodiments, the method further comprises running a node clean-up process comprising checking a status of each node in the cluster by reading each host configuration in each host directory in the one or more host directories on a recurring basis and, responsive to a determination that a respective node in the cluster has failed to update its status in the host configuration file corresponding to the respective node within a first time-out period, moving the job definition file of each respective job that is in the host directory corresponding to the respective node back into the pending jobs directory thereby adding each said respective job back to the queue.

In some such embodiments, the memory further comprises a failed jobs directory, and the method further comprises: responsive to determining that a respective node in the cluster has failed to update its status in the node status file corresponding to the respective node within a second time-out period, moving the job definition file of each respective job that is in the host directory corresponding to the respective node into the failed jobs directory; and removing the respective node from the cluster.

In some embodiments the status written to a node status file for a node in the cluster comprises any combination of: a state of the corresponding node, a timestamp, a remaining number of reservable number of processing cores that is currently available on the corresponding node, a remaining amount of reservable memory that is currently available on the corresponding node, a total number of reservable number of processing cores that is available on the corresponding node, a total amount of reservable memory that is available on the corresponding node, and an instance identifier for the respective node.

In some embodiments, the cluster is configurable between a permissive status and a non-permissive status. When the cluster is in the permissive status, nodes can be added to the cluster in the manner described above. When the cluster is in the non-permissive status, nodes cannot be added to the cluster. Accordingly, when the cluster is in the non-permissive status and a first job in the queue has been in the queue for more than a predetermined amount of time, the method further comprises: moving the job definition file of the first job in the queue from the pending jobs directory to the host directory corresponding to a respective node in the cluster that is most likely able to handle the first job first and revoking the draw privilege of the respective node until the respective node has completed the first job. This forces the node to complete the first job.

In some embodiments, the method further comprises, responsive to determining that the cluster does not include a node that has a sufficient amount of reservable memory or a sufficient amount of reservable processing cores to handle a first job in the queue that requires the greatest amount of memory or the most number of processing cores: submitting a request for a node that has sufficient amount of reservable memory or a sufficient amount of reservable processing cores to handle the first job; and adding the node to the cluster. This ensures that a node that can handle a large job that is in the queue is added to the cluster.

In some embodiments, the cluster is configurable between a permissive status and a non-permissive status and the method further comprises obtaining, on a recurring basis, for each respective node in the cluster, a current availability score of the respective node. There is computed, on the recurring basis, a total availability score for the cluster as a summation of each respective current availability score of each node in the cluster. The cluster is allowed to be in the permissive status when the total availability score is less than a first predetermined limiter, and the cluster is required to be in the non-permissive status when the total availability score exceeds the first predetermined limiter. When the cluster is in the permissive status, the adding of nodes to the cluster in the manner described above is permitted. When the cluster is in the non-permissive status, the adding of nodes in the manner described above is not permitted. In some such embodiments, the method further comprises revoking the draw privilege of a node in the cluster when the total availability score exceeds the first predetermined limiter; and immediately terminating a node in the cluster when the total availability score exceeds a second predetermined limiter.

In some embodiments, a respective node in the cluster that has the draw privilege draws a job from the queue when the respective node has an availability of reservable memory and reservable processing cores by reserving the job in the queue with the oldest timestamp subject to the constraint that the job can be handled by the available reservable memory and reservable processing cores of the respective node.

In some embodiments, the method further comprises adding a respective job to the queue. In some such embodiments the respective job is added to the queue by creating an identifier for the respective job, and creating a job data construct for the respective job. In some such embodiments, the job data construct tracks comprises the identifier for the respective job, and any combination of a name of the respective job, an account associated with the respective job, a user name of a person submitting the respective job, a timestamp of when the job was submitted, a timestamp for when the job is drawn by a respective node in the cluster of nodes, a timestamp for when the job is completed, an indication of a number of processor cores required by the respective job or an amount of memory required by the respective job, an identifier field for identifying the respective node in the cluster of nodes that drew the job, and an exit code that was received upon completion of the job.

In some embodiments, the one or more node resource requirements comprises a computer memory requirement and a number of processing cores required.

In some embodiments, the first epic is a predetermined amount of time (e.g., five minutes, 10 minutes, etc.). In some embodiments, each epic in the plurality of epics is a predetermined amount of time (e.g., five minutes, 10 minutes, etc.).

In some embodiments, the addition of the first one or more nodes to the cluster comprises installing a distributed computing module on each node in the one or more nodes. Moreover, for some such embodiments, for a first node in the one or more nodes, the installed distributed computing module executes a procedure comprising scanning the queue in accordance with the draw privilege, thereby identifying the one or more jobs from the queue during the first epic to run on the first node. In some embodiments, the computing system comprises a pending jobs directory that is shared by all the nodes in the cluster. In such embodiments, the method further comprises writing a job definition file in the pending jobs directory for each respective job in the queue and the adding of the first one or more nodes to the cluster comprises creating a respective host directory for each respective node in the first one or more nodes thereby creating one or more host directories, and writing a corresponding node status file in the corresponding host directory for each respective node in the first one or more nodes. In some such embodiments, the procedure executed by the distributed computing module further comprises moving the job definition file of a first job in the queue from the pending jobs directory to the host directory corresponding to the first node when the respective distributed computing module draws the job from the queue for execution on the first node thereby preventing other nodes in the cluster from taking the first job. In some such embodiments, the procedure executed by the distributed computing module further comprises executing the first job, tracking progress of the first job, tracking resource utilization of the first job while the first job is executing, and reporting on the resource utilization of the first job. In some embodiments, the first procedure further comprises installing one or more software applications on the first node that are capable of executing one or more jobs in the queue. In some embodiments, the first node includes an operating system and the first procedure further comprises altering a parameter of the operating system. In some embodiments, the first procedure further comprises configuring access for the first node to an authentication mechanism such as a lightweight directory access protocol mechanism. In some embodiments, the first procedure further comprises configuring a network resource. In some embodiments, the installed distributed computing module configures the first node in accordance with a continuous integration/continuous deployment tool. In some embodiments, the distributed computing module is acquired by each node in the first one or more nodes from a file system that is shared by the cluster prior to installing a distributed computing module on each node in the one or more nodes. In some embodiments, the first procedure comprises providing an updated current availability score for the respective node class.

Another aspect of the present disclosure provides a non-transitory computer readable storage medium stored on a computing device. The computing device comprises one or more processors and a memory. The memory stores one or more programs for execution by the one or more processors. The one or more programs singularly or collectively comprise instructions for executing a method comprising, for a first epic in a plurality of epics: identifying a first plurality of jobs in a queue. Each respective job in the first plurality of jobs is associated with a timestamp that indicates when the respective job was submitted to the queue and specifies one or more node resource requirements. The method further comprises determining a composite computer memory requirement and a composite processing core requirement for the first plurality of jobs from the one or more node resource requirements of each job in the first plurality of jobs, when a difference between the timestamp of an oldest job in the queue and the onset of the first epic exceeds a time threshold. The method further comprises identifying a first one or more nodes to add to a cluster during the first epic to satisfy at least a subset of the composite computer memory requirement and the composite processing core requirement. In some such embodiments, this identifying comprises: (i) obtaining, for each respective node class in a first plurality of node classes: (a) a current availability score, (b) a reservable number of processing cores, and (c) a reservable memory capability of the respective node class. The identifying further comprises (ii) submitting a request for one or more nodes of a corresponding node class in the first plurality of node classes when a demand score for the corresponding node class satisfies the current availability score for the corresponding node class by a first threshold amount. A response to the request is received. The response includes an acknowledgement and updated current availability score for the respective node class when the request for the one or more nodes of the corresponding node class is accepted, or a declination when the request for the one or more nodes of the corresponding node class is rejected, thereby identifying the first one or more nodes to add to the cluster of nodes during the first epic. The method further comprises adding the first one or more nodes to the cluster of nodes during the first epic and granting each respective node in the cluster of nodes with a draw privilege. The draw privilege permits a respective node to draw one or more jobs from the queue during the first epic subject to a constraint that the collective computer memory requirements and processing core requirements of the one or more jobs collectively drawn by a respective node in the cluster of nodes does not exceed a number of reservable processing cores and a reservable memory capability of the respective node. Further, a first node in the cluster of nodes draws more than one job from the queue for concurrent execution on the first node during the first epic.

Another aspect of the present disclosure provides a method comprising, at a computer system comprising one or more processors and a memory, for a first epic in a plurality of epics, and for a first epic in a plurality of epics, identifying a first plurality of jobs in a queue, where each respective job in the first plurality of jobs is associated with a timestamp that indicates when the respective job was submitted to the queue and specifies one or more node resource requirements. The method further comprises determining a composite computer memory requirement and a composite processing core requirement for the first plurality of jobs from the one or more node resource requirements of each job in the first plurality of jobs, when a difference between the timestamp of an oldest job in the queue and the onset of the first epic exceeds a time threshold. The method further comprises identifying a first one or more nodes to add to a cluster during the first epic to satisfy at least a subset of the composite computer memory requirement and the composite processing core requirement. The identifying comprises: (i) obtaining, for each respective node class in a first plurality of node classes: (a) a current availability score, (b) a reservable number of processing cores, and (c) a reservable memory capability of the respective node class. The identifying further comprises (ii) submitting a request for one or more nodes of a corresponding node class in the first plurality of node classes when a demand score for the corresponding node class satisfies the current availability score for the corresponding node class by a first threshold amount. The identifying still further comprises (iii) receiving a response to the request, where the response includes: an acknowledgement and updated current availability score for the respective node class when the request for the one or more nodes of the corresponding node class is accepted, or a declination when the request for the one or more nodes of the corresponding node class is rejected. This identifying repeats, or performs concurrently, additional instances of the submitting (ii) and receiving (iii) until a first occurrence of (a) each node class in the first plurality of node classes being considered for a request by the submitting (ii) or (b) receiving a sufficient number of acknowledgements through instances of the receiving (iii) to collectively satisfy the composite computer memory requirement and the composite processing core requirement of the first plurality of jobs, thereby identifying the first one or more nodes to add to the cluster of nodes during the first epic. The method further comprises adding the first one or more nodes to the cluster of nodes during the first epic. The method further comprises granting each respective node in the cluster of nodes with a draw privilege, where the draw privilege permits a respective node to draw one or more jobs from the queue during the first epic subject to a constraint that the collective computer memory requirements and processing core requirements of the one or more jobs collectively drawn by a respective node in the cluster of nodes does not exceed a number of reservable processing cores and a reservable memory capability of the respective node. Further, a first node in the cluster of nodes draws, in some instances, more than one job from the queue for concurrent execution on the first node during the first epic, or is at least configured to be able to do so should the need arise.

Another aspect of the present disclosure provides management code that is run on nodes once they are added to a cluster. This software manages what jobs nodes actually run as well as coordination with the above-identified master process that were claimed and each node in the cluster. Accordingly, another aspect of the present disclosure provides a computing system comprising one or more processors and a memory. The memory stores one or more programs for execution by the one or more processors. The one or more programs singularly or collectively comprise instructions for executing a method in which a first plurality of jobs in a queue is identified. In some embodiments, each respective job in the first plurality of jobs is optionally associated with a timestamp that indicates when the respective job was submitted to the queue and specifies one or more node resource requirements. A composite computer memory requirement and a composite processing core requirement are determined for the first plurality of jobs, from the one or more node resource requirements of each job in the first plurality of jobs. A first one or more nodes to add to a cluster to satisfy at least a subset of the composite computer memory requirement and the composite processing core requirement is identified and the first one or more nodes are, in fact, added to the cluster of nodes by installing a distributed computing module on each node in the first one or more nodes. Each respective node in the cluster of nodes, including the recently added nodes, is a granted with a draw privilege. The draw privilege permits the respective node in the cluster of nodes to draw one or more jobs from the queue subject to a constraint that the collective computer memory requirements and processing core requirements of the one or more jobs collectively drawn by the respective node in the cluster of nodes does not exceed a number of reservable processing cores and a reservable memory capability of the respective node. Specifically, for a first node in the first one or more nodes, the installed distributed computing module executes a procedure comprising scanning the queue in accordance with the draw privilege, thereby identifying one or more jobs from the queue during the first epic for execution on the first node.

In some embodiments, the identifying of the first one or more nodes comprises (i) obtaining, for each respective node class in a first plurality of node classes: (a) a current availability score, (b) a reservable number of processing cores, and (c) a reservable memory capability of the respective node class, (ii) submitting a request for one or more nodes of a corresponding node class in the first plurality of node classes when a demand score for the corresponding node class satisfies the current availability score for the corresponding node class by a first threshold amount, and (iii) receiving a response to the request, where the response includes: an acknowledgement and updated current availability score for the respective node class when the request for the one or more nodes of the corresponding node class is accepted, or a declination when the request for the one or more nodes of the corresponding node class is rejected, thereby identifying the first one or more nodes to add to the cluster of nodes during the first epic.

In some embodiments, the above-identified requests are in the form of electronic bids for nodes in a public auction. Such bids may be rejected or may be fulfilled only to be superseded by another bid, later. In accordance with some such embodiments, the request is submitted to a public auction in which multiple requests are received for the one or more nodes of the corresponding node class from a plurality of bidders, and the response includes the acknowledgement when the request outbids a sufficient number of other bidders in the plurality of bidders, and the response includes the declination when the request does not outbid the sufficient number of other bidders in the plurality of bidders. In some such embodiments, the response includes the acknowledgement when the request outbids all other bidders in the plurality of bidders. In some such embodiments, the response includes the acknowledgement and, responsive to a bid by another bidder that outbids the request at a subsequent time, removing the one or more nodes of the corresponding node class.

In some embodiments, the computing system further comprises a pending jobs directory, the method further comprises writing a job definition file in the pending jobs directory for each respective job in the queue, the addition of the first one or more nodes to the cluster further comprises creating a respective host directory for each respective node in the first one or more nodes thereby creating a plurality of host directories, and writing a corresponding node status file in the corresponding host directory for each respective node in the cluster. In some such embodiments, the procedure executed by a distributed computing module running on a first node in the cluster further comprises moving the job definition file of a first job in the queue from the pending jobs directory to the host directory corresponding to the first node when the respective distributed computing module draws the job from the queue thereby preventing other nodes in the cluster from taking the first job.

In some embodiments, the procedure executed by the distributed computing module further comprises executing the first job on the first node, tracking progress of the first job, tracking resource utilization of the first job while the first job is executing, and reporting on the resource utilization of the first job. In some embodiments, the procedure executed by the distributed computing module of the first node further comprises installing a software application on the first node that is capable of executing a job in the queue. In some embodiments, the above-described first node in the cluster has an operating system and the procedure executed by the distributed computing module on the first node further comprises altering a parameter of the operating system. In some embodiments, the first procedure further comprises configuring access for the first node to an authentication mechanism (e.g., a lightweight directory access protocol mechanism). In some embodiments, the procedure executed by the distributed computing module on the first node further comprises configuring a network resource. In some embodiments, the installed distributed computing module on the first node configures the first node in accordance with a continuous integration/continuous deployment tool. In some embodiments, the distributed computing module is acquired by each node in the first one or more nodes from a file system that is shared by the cluster prior to installing a distributed computing module on each node in the one or more nodes.

Another aspect of the present disclosure provides a computing system comprising one or more processors and a memory. The memory stores one or more programs for execution by the one or more processors. The one or more programs singularly or collectively comprise instructions for executing a method. In the methods, for a plurality of jobs in a queue, where each respective job in the plurality of jobs is associated with a timestamp that indicates when the respective job was submitted to the queue and specifies one or more node resource requirements, a composite computer memory requirement and a composite processing core requirement is determined for the plurality of jobs from the one or more node resource requirements of each job in the plurality of jobs. Further, in the method, one or more nodes to add to a cluster are identified in order to satisfy at least a subset of the composite computer memory requirement and the composite processing core requirement. This identifying comprises (i) obtaining a current availability score or list price for each respective node class in a plurality of node classes, and (ii) submitting a request for one or more nodes of a corresponding node class in the plurality of node classes when a demand score for the corresponding node class either (a) satisfies the current availability score for the corresponding node class by a first threshold amount or (b) satisfies the list price for the corresponding node class. In some embodiments, the request is submitted for one or more nodes of a corresponding node class in the plurality of node classes when a demand score for the corresponding node class satisfies the current availability score for the corresponding node class by a first threshold amount. In some embodiments, the request is submitted for one or more nodes of a corresponding node class in the plurality of node classes when a demand score for the corresponding node class satisfies the list price for the corresponding node class.

In the method, the one or more nodes is added to the cluster of nodes. In some such embodiments, this adding comprises installing a distributed computing module on each respective node in the one or more nodes.

In the methods, each respective node in the one or more nodes is granted with a draw privilege. The draw privilege permits the distributed computing module of a respective node to draw one or more jobs from the plurality of jobs subject to a constraint that the collective computer memory requirements and processing core requirements of the one or more jobs collectively drawn by a respective node in the cluster of nodes does not exceed a number of reservable processing cores and a reservable memory capability of the respective node. In such embodiments, the respective node identifies the one or more jobs by scanning the plurality of jobs in accordance with the draw privilege.

In some embodiments, the submitting the request for one or more nodes of the corresponding node class in the plurality of node classes occurs when the demand score for the corresponding node class satisfies the current availability score for the corresponding node class by the first threshold amount. In some such embodiments, the identifying further comprises receiving a response to the request, where the response includes an acknowledgement and updated current availability score for the respective node class when the request for the one or more nodes of the corresponding node class is accepted, or a declination when the request for the one or more nodes of the corresponding node class is rejected. In such embodiments, the corresponding node class is blacklisted for a period of time when a declination is received by removing the node class from the plurality of node classes for the period of time. In some such embodiments, the period of time is between one half hour and five hours. In some such embodiments, the period of time is between one hour and four hours. In some such embodiments, the period of time is between ninety minutes and three hours.

In some embodiments, identifying the one or more nodes to add to a cluster to satisfy at least a subset of the composite computer memory requirement and the composite processing core requirement further comprises (v) repeating, or performing concurrently, additional instances of the submitting (ii) and receiving (iii) until a first occurrence of (a) each node class in the plurality of node classes being considered for a request by the submitting (ii) or (b) receiving a sufficient number of acknowledgements through instances of the receiving (iii) to collectively satisfy the composite computer memory requirement and the composite processing core requirement of the plurality of jobs.

In some embodiments, the demand score for a respective node class in the plurality of node classes is penalized when the current availability score for the respective node class is within a second threshold amount of an initial demand score for the respective node class.

In some embodiments, the submitting the request for one or more nodes of the corresponding node class in the plurality of node classes occurs when the demand score for the corresponding node class satisfies the list price for the corresponding node class.

In some embodiments, each respective job in the plurality of jobs is associated with an originating user identifier, and the method further comprises associating the originating user of a first job in the plurality of jobs with all or a portion of the updated current availability score of the node class of the respective node that draws the first job in the plurality of jobs in the granting step.

In some embodiments, the demand score for the respective node class is determined by (i) the number of reservable processing cores of the respective node class, and (ii) the reservable memory capability of the respective node class. In some embodiments, the demand score for the respective node class is further determined by a processor performance of a reservable processing core of the respective node class.

In some embodiments, at least one node in the one or more nodes is a virtual machine. In some embodiments, the method further comprises rank ordering the plurality of node classes prior to the submitting (ii) through a first procedure that comprises determining a respective effective availability score for each respective node class in the plurality of node classes as a function of a ratio of (a) the current availability score or list price for the respective node class and (b) a combination of (i) the reservable number of processing cores for the respective node class and (ii) a likelihood of usefulness of the respective node class, where the likelihood of usefulness is determined by a difference in the current availability score and a demand score for the respective node class, thereby rank ordering the plurality of node classes into an order. In such embodiments, the identifying the one or more nodes to add to the cluster to satisfy at least a subset of the composite computer memory requirement and the composite processing core requirement uses the rank order of the plurality of node classes to determine which node class in the plurality of node classes to submit the request.

In some embodiments, the method further comprises displaying a summary of the node cluster, where the node summary comprises, for each respective node in the node cluster, how many jobs drawn from the queue that the respective node is presently executing.

In some embodiments, a job in the plurality of jobs comprises a container.

In some embodiments a job in the plurality of jobs comprises an operating system process.

In some embodiments, the memory further comprises a pending jobs directory, and the method further comprises writing a job definition file in the pending jobs directory for each respective job in the queue. In some embodiments, the adding further comprises creating a respective host directory for each respective node in the one or more nodes thereby creating a plurality of host directories and writing a corresponding node status file in the corresponding host directory for each respective node in the one or more nodes. Further, the method further comprises updating a status of each respective node in the cluster by updating the node status file corresponding to the respective node based upon a status received from the respective node and moving the job definition file of a job in the queue from the pending jobs directory to the host directory corresponding to a respective node in the cluster when the respective node draws the job from the queue. In some embodiments, the method further comprises running a node clean-up process comprising checking a status of each node in the cluster by reading each host configuration in each host directory in the plurality of host directories on a recurring basis, and responsive to determining that a respective node in the cluster has failed to update its status in the host configuration file corresponding to the respective node within a first time-out period, moving the job definition file of each respective job that is in the host directory corresponding to the respective node back into the pending jobs directory thereby adding each said respective job back to the queue.

In some embodiments, the status comprises any combination of: a state of the corresponding node, a timestamp, a remaining number of reservable number of processing cores that is currently available on the corresponding node, a remaining amount of reservable memory that is currently available on the corresponding node, a total number of reservable number of processing cores that is available on the corresponding node, a total amount of reservable memory that is available on the corresponding node, and an instance identifier for the respective node.

In some embodiments, the cluster is configurable between a permissive status and a non-permissive status, and when the cluster is in the permissive status, the adding the one or more nodes to the cluster of nodes is permitted, and when the cluster is in the non-permissive status, the adding the one or more nodes to the cluster of nodes is not permitted, and when the cluster is in the non-permissive status and a first job in the queue has been in the queue for more than a predetermined amount of time, the method further comprises moving the job definition file of the first job in the queue from the pending jobs directory to the host directory corresponding to a respective node in the cluster that is most likely able to handle the first job and revoking the draw privilege of the respective node until the respective node has completed the first job.

In some embodiments, the method further comprises, responsive to determining that the cluster does not include a node that has a sufficient amount of reservable memory or a sufficient amount of reservable processing cores to handle a first job in the queue that requires the greatest amount of memory or the most number of processing cores, submitting a request for a node that has sufficient amount of reservable memory or a sufficient amount of reservable processing cores to handle the first job and adding the node to the cluster.

In some embodiments, the cluster is configurable between a permissive status and a non-permissive status. Moreover, in such embodiments, the method further comprises obtaining, on a recurring basis, for each respective node in the cluster, a current availability score or list price of the respective node, computing, on the recurring basis, a total availability score for the cluster as a summation of each respective current availability score or list price of each node in the cluster, allowing the cluster to be in the permissive status when the total availability score is less than a first predetermined limiter, and requiring the cluster to be in the non-permissive status when the total availability score exceeds the first predetermined limiter. In such embodiments when the cluster is in the permissive status, the adding the one or more nodes to the cluster of nodes is permitted, and when the cluster is in the non-permissive status, the adding the one or more nodes to the cluster of nodes is not permitted. In some such embodiments, the method further comprises revoking the draw privilege of a node in the cluster when the total availability score exceeds the first predetermined limiter and immediately terminating a node in the cluster when the total availability score exceeds a second predetermined limiter.

In some embodiments, the method further comprises adding a respective job to the queue, where the adding comprises creating an identifier for the respective job, and creating a job data construct for the respective job. In such embodiments, the job data construct comprises the identifier for the respective job, and any combination of a name of the respective job, an account associated with the respective job, a user name of a person submitting the respective job, a timestamp of when the job was submitted, a timestamp for when the job is drawn by a respective node in the cluster of nodes, a timestamp for when the job is completed, an indication of a number of processor cores required by the respective job or an amount of memory required by the respective job, an identifier field for identifying the respective node in the cluster of nodes that drew the job, and an exit code that was received upon completion of the job.

In some embodiments, the one or more node resource requirements comprises a computer memory requirement and a number of processing cores required.

In some embodiments, the installed distributed computing module executes a procedure comprising scanning the queue in accordance with the draw privilege, thereby identifying the one or more jobs from the queue.

In some embodiments, the computing system further comprises a pending jobs directory, the method further comprises writing a job definition file in the pending jobs directory for each respective job in the queue, and the adding the one or more nodes to the cluster of nodes further comprises creating a respective host directory for each respective node in the one or more nodes thereby creating one or more host directories, and writing a corresponding node status file in the corresponding host directory for each respective node in the one or more nodes. In such embodiments, the procedure executed by the distributed computing module further comprises: moving the job definition file of a first job in the queue from the pending jobs directory to the host directory of the node corresponding to the first job when the respective distributed computing module draws the first job from the queue thereby preventing other nodes in the cluster from taking the first job. In some such embodiments, the procedure executed by the distributed computing module further comprises executing the first job, tracking progress of the first job, tracking resource utilization of the first job while the first job is executing, and reporting on the resource utilization of the first job.

In some embodiments, the distributed computing module is installed on a respective node in the one or more nodes as an image, and wherein the image further comprises an operating system. In some such embodiments, the image further comprises instructions for acquiring from a remote location one or more programs required to run all or a portion of a job in the plurality of jobs. In some such embodiments, the remote location is a file system that is shared by the cluster prior to installing the distributed computing module on each node in the one or more nodes. In some embodiments, the image further comprises a software module that is configured to execute all or a portion of a job in the plurality of jobs. In some embodiments, the image further comprises a plurality of software module, where the plurality of software modules is collectively configured to execute each a job in the plurality of jobs.

In some embodiments the procedure comprising scanning the queue in accordance with the draw privilege further comprises providing an updated current availability score for the respective node class.

Another aspect of the present disclosure provides a method comprising, a computer system comprising one or more processors and a memory, for a plurality of jobs in a queue, where each respective job in the plurality of jobs is associated with a timestamp that indicates when the respective job was submitted to the queue and specifies one or more node resource requirements, determining a composite computer memory requirement and a composite processing core requirement, for the plurality of jobs, from the one or more node resource requirements of each job in the plurality of jobs. Further in the method, a one or more nodes to add to a cluster to satisfy at least a subset of the composite computer memory requirement and the composite processing core requirement is identified. This identifying comprises: (i) obtaining a current availability score or list price for each respective node class in a plurality of node classes, and (ii) submitting a request for one or more nodes of a corresponding node class in the plurality of node classes when a demand score for the corresponding node class (a) satisfies the current availability score for the corresponding node class by a first threshold amount or (b) satisfies the list price for the corresponding node class. Further in the methods, the one or more nodes is added to the cluster of nodes, where the adding comprising installing a distributed computing module on each respective node in the one or more nodes. Further in the method, each respective node in the one or more nodes is granted with a draw privilege, where the draw privilege permits the distributed computing module of a respective node to draw one or more jobs from the plurality of jobs subject to a constraint that the collective computer memory requirements and processing core requirements of the one or more jobs collectively drawn by a respective node in the cluster of nodes does not exceed a number of reservable processing cores and a reservable memory capability of the respective node, and where the first node identifies the one or more jobs by scanning the plurality of jobs in accordance with the draw privilege. In some such embodiments, the submitting the request for one or more nodes of the corresponding node class in the plurality of node classes occurs when the demand score for the corresponding node class satisfies the current availability score for the corresponding node class by the first threshold amount. Alternatively, in some such embodiments, the submitting the request for one or more nodes of the corresponding node class in the plurality of node classes occurs when the demand score for the corresponding node class satisfies the list price for the corresponding node class.

Another aspect of the present disclosure provides a non-transitory computer readable storage medium stored on a computing device, the computing device comprising one or more processors and a memory, the memory storing one or more programs for execution by the one or more processors, where the one or more programs singularly or collectively comprise instructions for executing a method that encompasses any of the processes, procedures or methods disclosed herein.

BRIEF DESCRIPTION OF THE DRAWINGS

The implementations disclosed herein are illustrated by way of example, and not by way of limitation, in the figures of the accompanying drawings. Like reference numerals refer to corresponding parts throughout the drawings.

FIGS. 4A, 4B, 4C, 4D, 4E, and 4F illustrate example graphical user interfaces for distributed resource management of computationally intensive or memory intensive tasks, in accordance with some implementations of the present disclosure.

FIGS. 5A, 5B, 5C, 5D, 5E, 5F, and 5G collectively provide a flowchart of processes and features of systems and methods for distributed resource management of computationally intensive or memory intensive tasks in accordance with some implementations of the present disclosure. In these figures, elements in dashed boxes are optional.

FIG. 7 illustrates a file structure that is provided in accordance with some embodiments of the present disclosure.

Like reference numerals refer to corresponding parts throughout the several views of the drawings.

DETAILED DESCRIPTION

Figure 1:
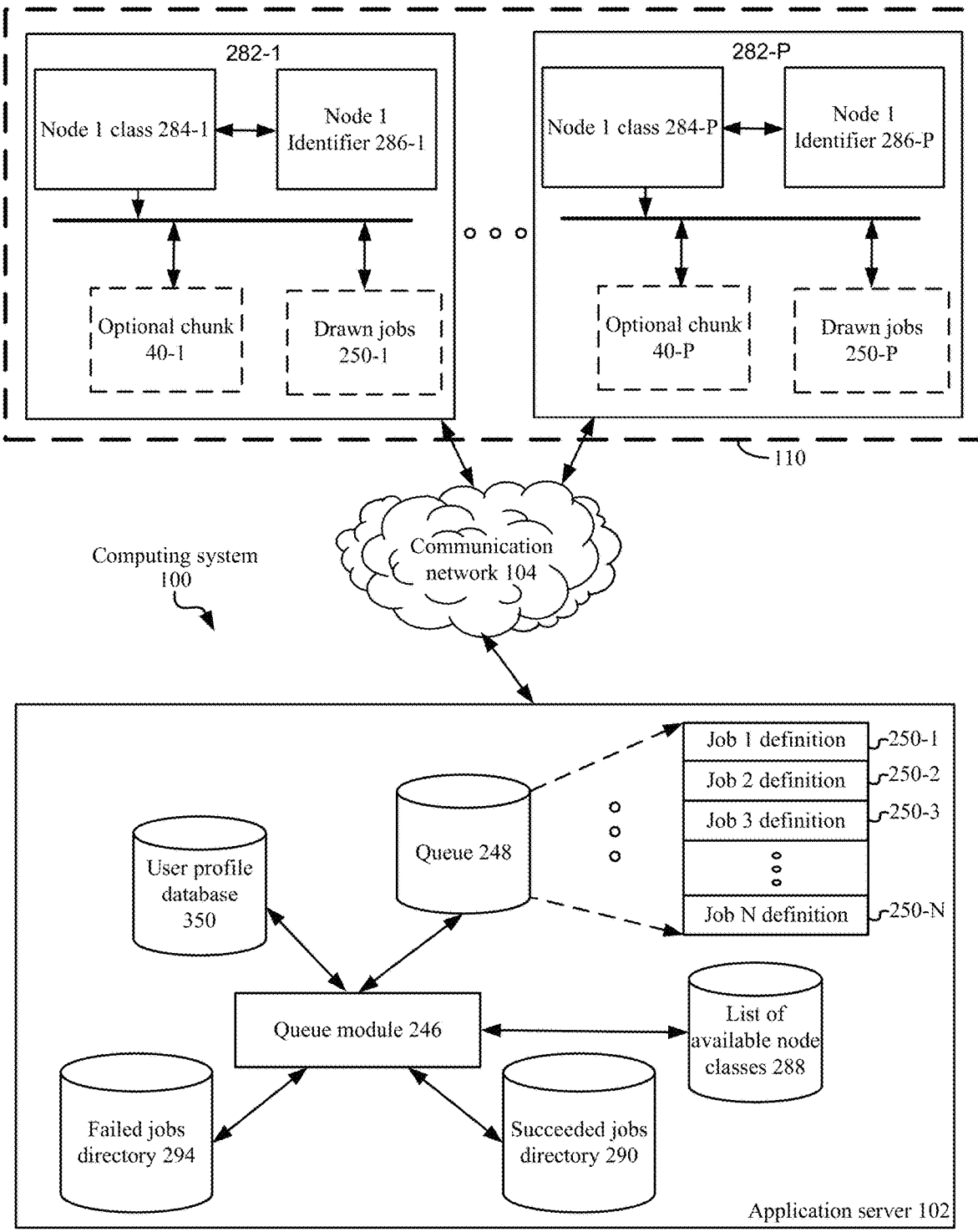
FIG. 1 is an example block diagram illustrating a computing system, in accordance with some implementations of the present disclosure.

Disclosed are systems, methods and nontransitory computer readable media for servicing a job queue of computationally intensive or memory intensive jobs for the purposes of executing these jobs in a distributed resource environment. Each job has node (computer) resource requirements. Composite job memory and processor requirements is determined from these requirements. In other words, the memory and processor requirements of each of the jobs in the queue is collectively summed to arrive at the composite job memory requirements and the composite processor requirements of the queue. Nodes that collectively satisfy these requirements are identified by obtaining, for each respective class of a plurality of node classes: an availability score of the respective node class, a number of processors of the respective node class, and a memory capability of the respective node class. Using this information, a determination is made as to which node class to seek. As part of this determination, a demand score is calculated for each of the node classes based on the characteristics of each node class.

In some embodiments, the demand score is affected by the current or historical price of nodes of the given node class. For instance, in some embodiments, the demand score is penalized by a measure of volatility in the historical prices of nodes of the given node class. In some embodiments, the demand score is penalized when the current price of nodes in the node class exceeds a threshold value, either in an absolute sense or normalized against one or more features of the node class such as the number of reservable processors of the node class. In some embodiments, the demand score for a node class is penalized by an expected cost of network traffic if node would reside in a different network than the other nodes of the cluster. A feature of the present disclosure is that jobs, even related jobs that use related data, do not have to run in the same physical datacenter. Thus, some nodes within the cluster may be in a first data center, whereas other jobs in the same cluster may be in a second data center that is geographically separated from the first data center.

A request for nodes of a node class in the plurality of node classes is made when the demand score for the node class satisfies (e.g., exceeds) the class availability score. An acknowledgement and updated availability score is optionally received upon request acceptance, and a declination is optionally received when the request was denied. Declination is possible even in the case where the node class satisfied the class availability score because the class availability score is subject to change on a dynamic basis (e.g., as part of a multi-user bidding process). Thus, even though the demand score may have satisfied the original class availability score, and thus a request was sent, this does not guarantee that the request will be accepted because others may bid on nodes of the same node class thereby driving the class availability score beyond the demand score for that node class. Accordingly, a declination is optionally received upon request rejection. The submitting and, optionally, the receiving, is performing multiple times, if needed, until each node class in the plurality of available node classes has been considered for a request or sufficient number of nodes to satisfy the composite memory and processor requirements of the jobs in the queue have been identified. Nodes of the node classes that are identified through the above process of requests are added to an existing cluster of nodes. Each node in the cluster has the privilege to independently draw jobs from the queue subject to the collective requirements of the drawn jobs. In other words, a node in the cluster cannot draw more jobs from the queue than it can handle, from the perspective of the memory requirements and/or processor requirements of the drawn jobs.

Now that an overview of improved systems and methods for distributed resource management of computationally intensive or memory intensive tasks has been provided, additional details of systems, devices, and/or computers in accordance with the present disclosure are described in relation to the FIGS. 1, 2, 3, and 6.

FIG. 1 is a block diagram illustrating a computing system 100, in accordance with some implementations. In some implementations, the computing system 100 includes a plurality of nodes 282 (e.g., computing devices 281-1, . . . , 282-P) forming a cluster 110, a communication network 104, and one or more application server systems 102.

Referring to FIG. 1, in some implementations, an application server 102 includes a queue module 244 that facilitates the above identified actions. In some implementations, the application server 102 also includes a user profile database 350 for users of the application server. The user profile database stores characteristics of the user such as a user identifier and a costs associated with the user for running jobs on the computing system 100. In some implementations, the application server 102 also includes a summary module 246. The summary module 246 is used to provide summary statistics regarding jobs run on the computing system 100 as disclosed in further detail below.

In some implementations, the communication network 104 interconnects one or more nodes 282 with each other, and with the one or more application server systems 102. In some implementations, the communication network 104 optionally includes the Internet, one or more local area networks (LANs), one or more wide area networks (WANs), other types of networks, or a combination of such networks.

Referring to FIG. 1, in some implementations, an application server system 102 includes a queue module 246, a user profile database 350, a queue 248 comprising a plurality of job definitions 250, interchangeably referred to herein as (jobs), a list of available node classes 288, a failed jobs directory 294, and/or a succeeded jobs directory 290. In some embodiments, the queue module 246 services the jobs 250 in the queue using the available nodes 282 in accordance with the methods disclosed herein. Typically, a job 250 is a computational task that requires one or more processing cores and an amount of reservable computational memory to perform. In some embodiments, database equivalents are used for the failed jobs directory and succeeded jobs directory.

Figure 6:
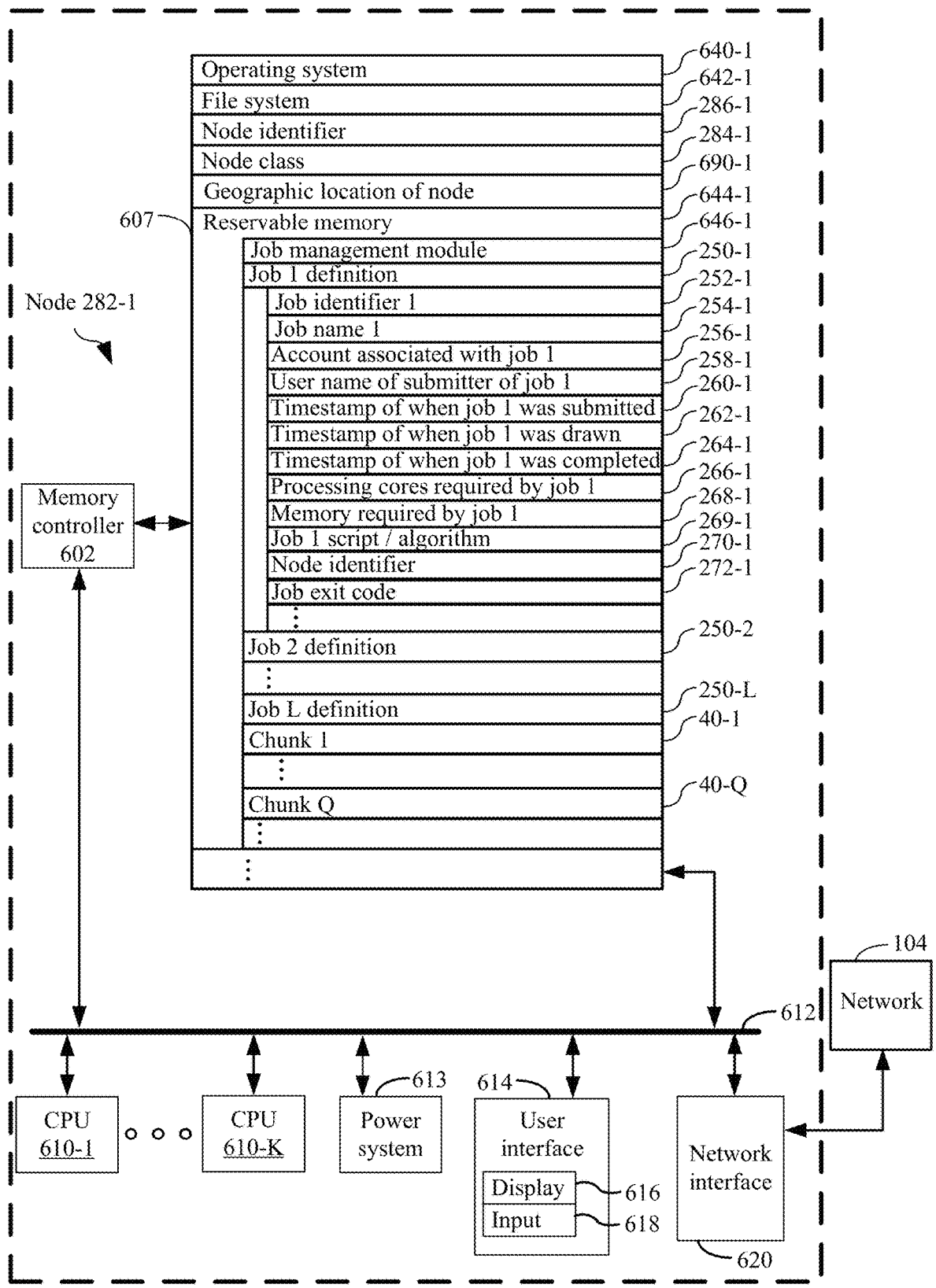
FIG. 6 illustrates an example block diagram of a node in accordance with some embodiments of the present disclosure.

In some embodiments, a job 250 requires at least one processing core to be performed. In some embodiments, a job 250 requires at least two, three, four, five, or six processing cores to be performed. Referring to FIG. 6, which discloses a node 282, a processing core is a processing unit of a central processing unit 610 that receives a set of instructions within a job 250 and performs calculations, or actions, based on those instructions. The set of instructions allow the job to perform one or more specific functions, such as the assembly of a nucleic acid sequence from a plurality of nucleic acid contigs. Some central processing units 610 have multiple processing cores, each of which can independently receive a set of instructions and thus each of which can concurrently service an independent job 250. In some embodiments, a node 282 has one or more central processing units 610, each of which has one or more processing cores. In the present disclosure, the term "processing core" and "thread" are used interchangeably.

In accordance with the systems and methods of the present disclosure, computing system 100 track jobs 250 in a queue, matches current load demand of the queue 248 with a cluster of nodes 282, each of which has the privilege to draw jobs 250 from the queue. In some embodiments, jobs that fail are moved to a failed jobs directory 294 whereas jobs that are successfully completed are moved to a succeeded jobs directory 290.

In some embodiments, queue module 246 maintains a profile in the user profile database 350 of each user that makes use of the queue module 244. In some embodiments, there are tens, hundreds, or thousands of users of the queue module 244 and the queue module 244 stores a profile for each such user in the user profile database 350. In some embodiments, the user profile database 350 does not store an actual identity of such users, but rather a simple login and password. In some embodiments, the profiles in the user profile database 350 are limited to the logins and passwords of users. In some embodiments, the profiles in user profile database 350 comprises user logins, passwords, and current balances in terms of computing system 100 resources used, and an identification of the jobs submitted by the user and their current task (in queue, completed, running, failed, etc.).

Figure 2:
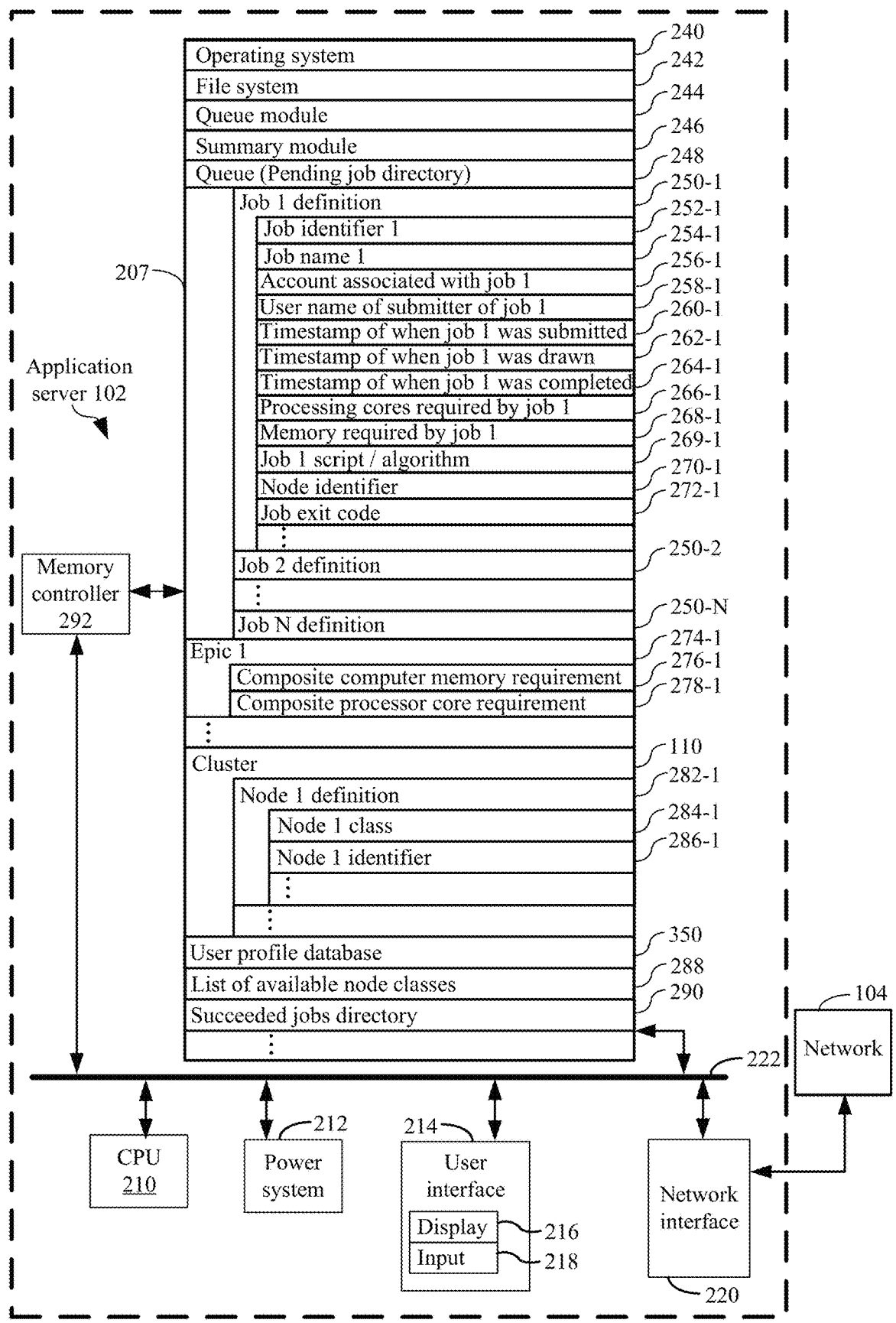
FIG. 2 is an example block diagram illustrating an application server, in accordance with some implementations of the present disclosure.

FIG. 2 is an example block diagram illustrating an application server 102, in accordance with some implementations of the present disclosure. It has one or more central processing units (CPU's) 210, memory controller 292, a network or other communications interface 220, a memory 207 (e.g., random access memory), a user interface 214, the user interface 214 including a display 216 and input 218 (e.g., keyboard, keypad, touch screen, mouse, track ball, communications port, etc.), one or more communication busses 222 for interconnecting the aforementioned components, and a power system 212 for powering the aforementioned components.

Memory 207 optionally includes high-speed random access memory and optionally also includes non-volatile memory, such as one or more magnetic disk storage devices, flash memory devices, or other non-volatile solid-state memory devices. Access to memory 207 by other components of application server 102, such as CPU(s) 210 is, optionally, controlled by memory controller 292.

The one or more processors 210 run or execute various software programs and/or sets of instructions stored in memory 207 to perform various functions for application server 102 and to process data.

Examples of networks 104 include, but are not limited to, the World Wide Web (WWW), an intranet, a wired network, and/or a wireless network, such as a cellular telephone network, a wireless local area network (LAN) and/or a metropolitan area network (MAN), and other devices by wireless communication. In some embodiments the communication is wireless, and the wireless communication optionally uses any of a plurality of communications standards, protocols and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11ac, IEEE 802.11ax, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

As illustrated in FIG. 2, the application server 102 preferably comprises an operating system 240 (e.g., iOS, DARWIN, RTXC, LINUX, UNIX, OS X, WINDOWS, or an embedded operating system such as VxWorks), which includes various software components and/or drivers for controlling and managing general system tasks (e.g., memory management, storage device control, power management, etc.) and facilitates communication between various hardware and software components. The application server 102 further optionally comprises a file system 242 which may be a component of the operating system 240, for managing files stored or accessed by the application server 102. Further still, the application server 102 further comprises a queue module 244 for servicing a job queue 248 of computationally intensive or memory intensive jobs 250 for the purposes of executing these jobs in a distributed resource environment (e.g., on computing system 100). In some embodiments, the queue module 244 comprises a communications sub-module (or instructions) for connecting the application server 102 with other devices (e.g., the nodes 282) via one or more network interfaces 220 (wired or wireless), and/or the communication network 104 (FIG. 1).

Figure 3A:
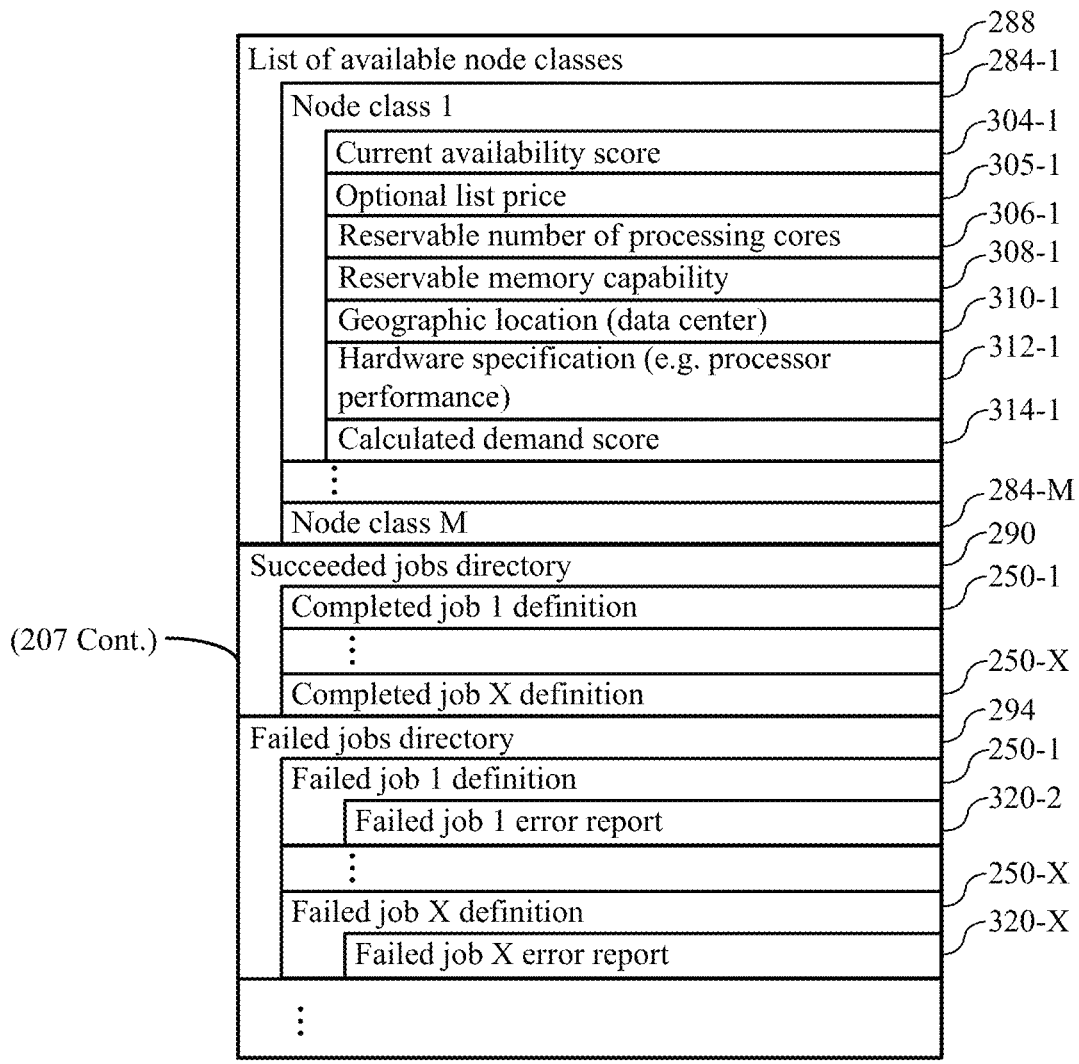
FIGS. 3A and 3B are example block diagrams further illustrating components stored in the memory of an application server, in accordance with some implementations of the present disclosure.
Figure 3B:
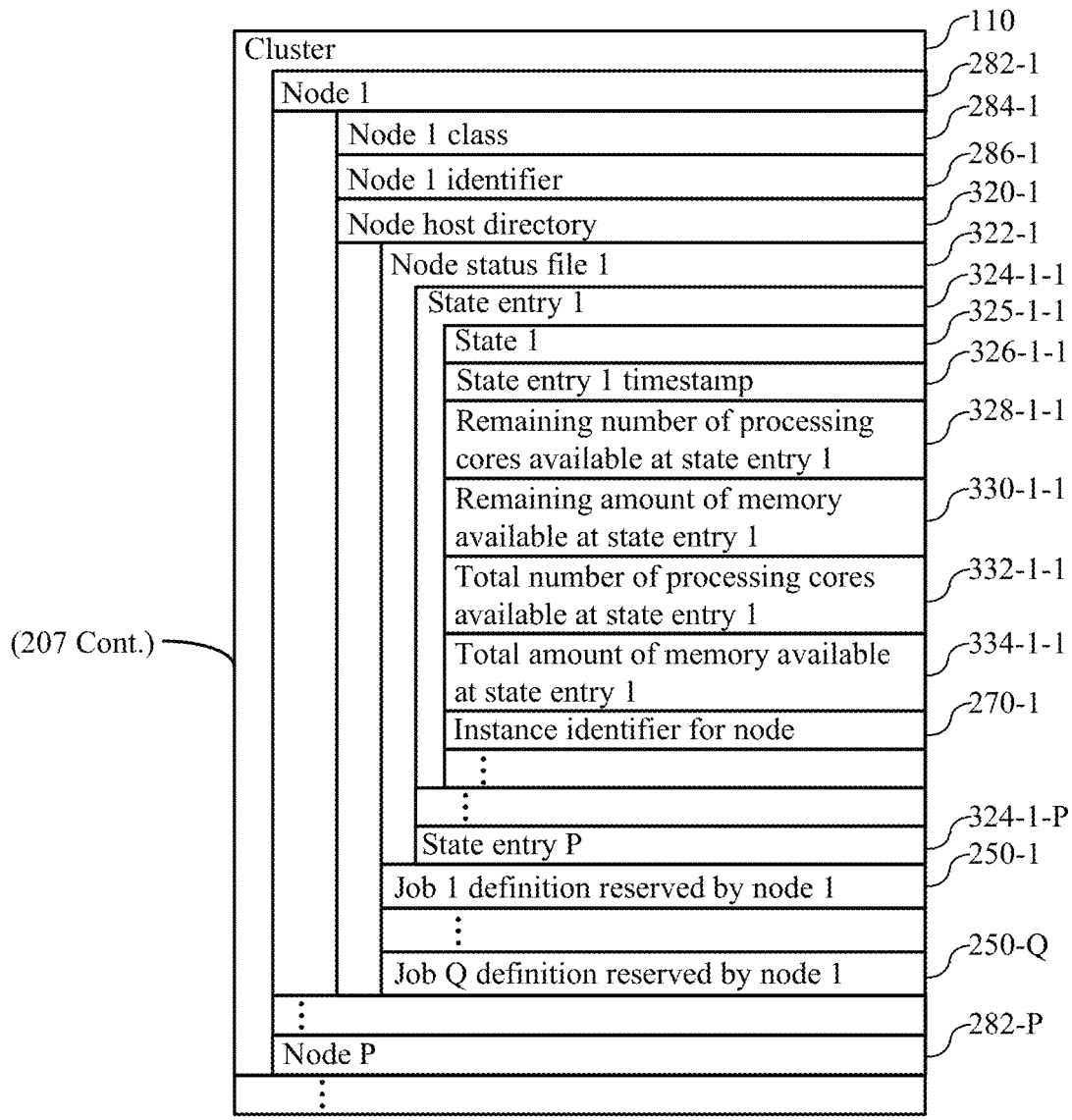

In some implementations, referring to FIGS. 2, 3A, and 3B, the memory 207 or alternatively the non-transitory computer readable storage medium further stores the following programs, modules and data structures, or a subset thereof:

- the queue module 248 described above, which includes a job definition 250 for each job, each such job definition comprising any combination of a job identifier 252, a job name 254, an account associated with the job 256, a user name 258 of the submitter of the job, a timestamp 260 of when the job was submitted to the queue 248, a timestamp 262 of when the job was drawn by a node 282 in the cluster 110, a timestamp 264 of when the job was completed by the cluster 110, a number 266 of processing cores required by the job, a memory required by the job 268, a job script and/or algorithm 269, a node identifier 270 that indicates which node 282 in the cluster 110 has drawn the job or completed the job, and/or a job exit code 272 which is assigned to the job by the node 282 upon completion of the job;
- one or more epics 274, each respective epic optionally representing a period of time, and each respective epic indicating an amount of node 282 resources needed by the queue 248 during the epic (e.g., in terms of a composite computer memory requirement 276 summed across one or more jobs in the queue, in terms of a composite processor core requirement 278 summed across one more jobs in the queue, etc.);
- a representation of a cluster 110, the representation including for each respective node a node definition 282, the node definition including a node class 284 of the respective node, a node identifier 286 that uniquely identifies the respective node and, optionally, a corresponding node host directory 320 that includes a node status file 322 for the respective node, the node status file 322 includes for each state entry 324 of a plurality of state entries made for the respective node over time, a timestamp 326, a remaining number of processing cores available 328 on the respective node, a remaining amount of memory available 330 on the respective node, a total number of processing cores available (irrespective of how many are currently reserved at the time of the respective state entry) 332 on the respective node, a total amount of reservable memory 334 (irrespective of how much is currently reserved at the time of the respective state entry), and/or an instance identifier for the node 270 that uniquely identifies the node;
- an optional user profile database 350 that includes a user profile of each user of the computing system 100;
- a list 288 of available node classes 284, each respective available node class specifying any combination of a current availability score 304, a list price 305, a reservable number of processing cores 306, a reservable memory capability 308, a geographic location 310, a hardware specification (e.g., processor performance) 312, and/or a calculated demand score 314;
- a succeeded jobs directory 290 that includes the job definition 250 of each respective job that has been completed by the computing system 100; and
- a failed jobs directory 294 that includes the job definition 250 and a failed job error report 320 of each respective job that has failed to be completed by the computing system 100.

In some implementations, one or more of the above identified elements are stored in one or more of the previously mentioned memory devices, and correspond to a set of instructions for performing a function described above. The above identified modules or programs (e.g., sets of instructions) need not be implemented as separate software programs, procedures or modules, and thus various subsets of these modules may be combined or otherwise re-arranged in various implementations. In some implementations, the memory 207 optionally stores a subset of the modules and data structures identified above. Furthermore, the memory 207 may store additional modules and data structures not described above. Moreover, in some embodiments the job script/algorithm 269 is not stored in the job definition 250.

FIG. 6 is an example block diagram illustrating a node 282 in accordance with some implementations of the present disclosure. The node 282 typically includes one or more processing units CPU(s) 610 (also referred to as processors), one or more network interfaces 620, memory 607, an optional user interface 614 that includes an optional display 616 and optional input device 618, and one or more communication buses 612 for interconnecting these components, and a power system 613 for powering these components. The communication buses 612 optionally include circuitry (sometimes called a chipset) that interconnects and controls communications between system components. The memory 607 includes high-speed random access memory, such as DRAM, SRAM, DDR RAM or other random access solid state memory devices and optionally includes non-volatile memory, such as one or more magnetic disk storage devices, optical disk storage devices, flash memory devices, or other non-volatile solid state storage devices. The memory 607, or alternatively the non-volatile memory device(s) within the memory 607, comprises a non-transitory computer readable storage medium. In some implementations, the memory 607 or alternatively the non-transitory computer readable storage medium stores the following programs, modules and data structures, or a subset thereof:

- an operating system 640, which includes procedures for handling various basic system services and for performing hardware dependent tasks;
- optionally, a file system 642 which may be a component of the operating system 640, for managing files stored or accessed by the node 282;
- a node identifier 286 that uniquely identifies the node 282;
- a node class 284 that specifies the class of the node 282;
- a geographic location 690 of the node 282;
- reservable memory 644 for storing data and programs to be executed on the node 282-1
- a job management module 646, stored in the reservable memory 644, for receiving privileges to draw one or more jobs 250 from the queue 248, and to monitor the status of these jobs as they execute on the respective node, and to provide state entries 324 for the node status file 322 corresponding to the node;
- one or more jobs 250, stored in the reservable memory, the one or more jobs 250 being drawn from the queue 248 in accordance with the methods detailed in the present disclosure; and
- one or more chunks 40, each of which is associated with a job drawn by the job management module 646 from the queue 248.

In some implementations, one or more of the above identified elements are stored in one or more of the previously mentioned memory devices, and correspond to a set of instructions for performing a function described above. The above identified modules or programs (e.g., sets of instructions) need not be implemented as separate software programs, procedures or modules, and thus various subsets of these modules may be combined or otherwise re-arranged in various implementations. In some implementations, the memory 607 optionally stores a subset of the modules and data structures identified above. Furthermore, the memory 607 may store additional modules and data structures not described above.

Although FIGS. 2 and 3 show an "application server 102" and FIG. 6 shows a node 282, these figures are intended more as functional description of the various features which may be present in the computing system 100 than as a structural schematic of the implementations described herein. In practice, and as recognized by those of ordinary skill in the art, items shown separately could be combined and some items could be separated.

FIGS. 4A, 4B, 4C, 4D, 4E, and 4F illustrate example graphical user interfaces 400 provided by the summary module 246 in accordance with some implementations of the present disclosure that is provided by the summary module. For instance, referring to FIGS. 4A and 4B, the graphical user interface 400 provides details on the cluster 110 during a given epic 274, including the number of nodes 282 that are in the cluster 110, and the node class 284 of these nodes, the number of users 404 that have submitted jobs 250 to the computing system 100, and for each such user, the number of jobs 250 they have submitted, the number of processing cores (threads) they are presently using, the amount of memory they are presently using, and the cost per hour they are incurring. The graphical user interface 400 further provides details on how many jobs are in the queue 248. In some embodiments, the summary module 246 can report detailed statistics showing how much money was spent by various users or by various kinds of jobs. In some embodiments, the summary module 246 can also calculate the amount of money that was wasted on nodes 282 that were included in the cluster but were not used. See, for example, FIG. 4E.

FIG. 5 is a flow chart illustrating a method for distributed resource management of computationally intensive or memory intensive tasks using the computing system 100 in accordance with some implementations. Referring to block 502 of FIG. 5A, in some implementations, a computing system 100 is provided that comprises one or more processors 210 and memory 207. The memory 207 stores one or more programs for execution by the one or more processors. The one or more programs singularly or collectively comprising instructions for executing a method for a first epic 274 in a plurality of epics. Referring to block 504, in some embodiments, the epic 274 is a predetermined amount of time (e.g., a regular or irregular interval of time). In some embodiments, an epic is a regular interval of time (e.g., one second, 10 seconds, one minute, 5 minutes, 10 minutes, 30 minutes, one hour, four hours, etc.) meaning that upon occurrence of this regular interval of time one epic 274 is completed and another epic begins. In some embodiments, an epic represents a time when the queue 248 is interrogated and there is no regular interval of time between a first epic 274, in which the queue 248 is interrogated a first time, and a subsequent second epic 274, in which the queue 248 is interrogated a second time.

Referring to block 506 a first plurality of jobs 250 are identified in the queue 248. To this end, each respective job 250 in the first plurality of jobs is associated with a timestamp 260 that indicates when the respective job was submitted to the queue and specifies one or more node resource requirements (e.g. processing cores required 266/ memory required 268) associated with the job. For instance, an example job in the queue has a timestamp 260 that indicates it has been in the queue 248 for five minutes, and specifies that it requires four threads (four processing cores) and 1 gigabyte of memory (e.g., random access memory).

Figure 5A:
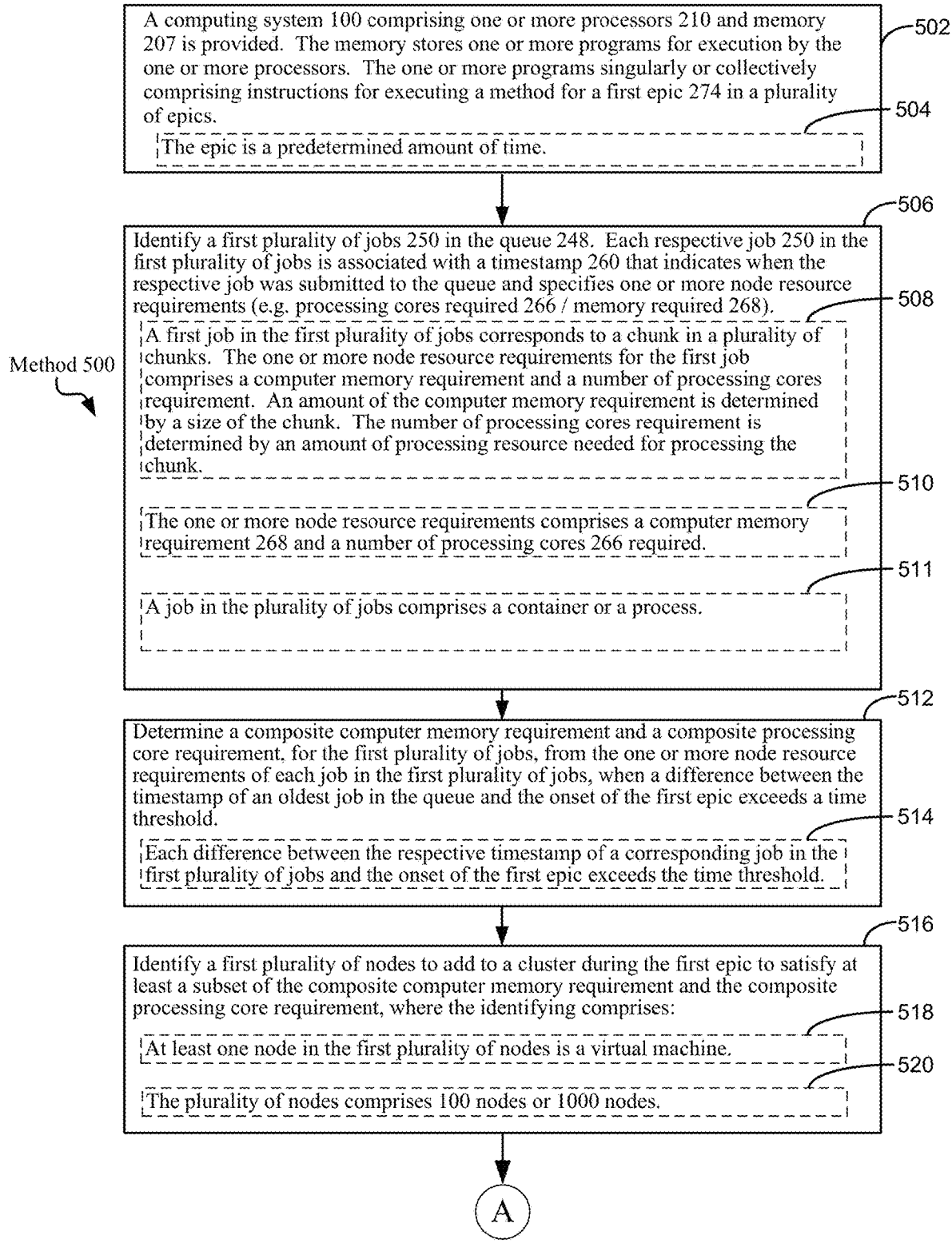

Referring to block 508 of FIG. 5A, in some embodiments a first job in the first plurality of jobs corresponds to a chunk 40 in a plurality of chunks. In distributed computing, a chunk is a set of data (e.g., a sub-set of rows of a matrix) which is sent to a processor for processing. Thus, in such embodiments, the first job is assigned to process the chunk 40 in accordance with a script or algorithm 269 associated with the job 250. For instance, the script or algorithm 269 may include one or more computer programs that direct a node to perform one or more sparse matrix multiplication operations on data within the chunk 40. In some embodiments, the script or algorithm 269 directs a node processing core to perform more than one million or more processor operations (e.g., floating point operations, etc.) to complete the script or algorithm 269. In some embodiments, the script or algorithm 269 is one or more compiled computer programs. In some embodiments, the script or algorithm 269 is one or more uncompiled computer programs that are executed using an interpreter program on the node. In some embodiments, the script or algorithm 269 directs a plurality of processing cores (e.g., 2 cores, 4 cores, etc.) to each perform more than one million or more processor operations to complete the script or algorithm 269. In some embodiments, the script or algorithm 269 directs one or more processing cores to perform more than one billion or more than one trillion processor operations to complete the script or algorithm 269. In some embodiments, the script or algorithm 269 directs one or more processing cores to perform more than $1 \times 10^7$, more than $1 \times 10^8$, more than $1 \times 10^9$, or more than $1 \times 10^{10}$ processor operations to successfully complete the script or algorithm 269. In some embodiments, the one or more node 282 resource requirements comprises a computer memory requirement 268 and a number of processing cores 266 requirement. In some such embodiments, the amount of the computer memory requirement 268 is determined by a size of a chunk 40 that has been assigned to the job 250. In some such embodiments, processing cores requirement (number of processing cores required to perform the job 250) 266 is determined by an amount of processing resource needed for processing the chunk.

Referring to block 510, in a specific embodiment, the one or more node resource requirements comprises a computer memory requirement 276 and a number of processing cores required 278 to complete the job.

Turning to block 511, in some embodiments a job in the plurality of jobs is a container. A container is a stand-alone, executable package of software that includes everything needed to run the software include code, runtime, system tools, system libraries, and settings. Standards exist for dividing applications into distributed containers. Breaking applications up in this way offers the ability to place portions of such applications on different physical and virtual machines. This flexibility offers advantages around workload management and provides the ability to easily make fault-tolerant systems. One such standard for putting applications into containers is Docker (See, the Internet at docker.com), an open-source project that provides a way to automate the deployment of applications inside software containers. Another standard for placing applications into containers is Rocket (CoreOS, San Francisco, Calif.) (See, the Internet at coreos.com).

Continuing to refer to block 511, in some embodiments a job in the plurality of jobs is a process. As used in this context, a process is an instance of a computer program that is being executed or about to be executed. The process contains the program code and its current activity (if it is executing). Depending on the operating system of the node 282 that a given process will run on, the process may be made up of multiple threads of execution that execute instructions concurrently.

Turning to block 512, in a given epic 274, a composite computer memory requirement and a composite processing core requirement is determined for a first plurality of jobs in the queue 248. This is done by evaluating the resource requirements of each job in the first plurality of jobs. In some embodiments, such an evaluation of the jobs occurs when a difference between the timestamp 260 of an oldest job in the queue 248 and the onset of the first epic 274 exceeds a time threshold. For example, in the case where the first epic is deemed to begin when the queue is polled for jobs 250 the job having the oldest timestamp 260 is identified. If the delta between the present polling time and this oldest timestamp 260 exceed a time threshold, then block 512 is invoked in order to assess the composite computer memory requirement and a composite processing core requirement, for the first plurality of jobs, from the one or more node resource requirements of each job in the first plurality of jobs. An example time threshold is one minute. In such an example, where the first epic is deemed to begin when the queue is polled, if the delta between the present polling time and the oldest timestamp 260 exceeds one minute, then block 512 is invoked in order to assess the composite computer memory requirement and/or a composite processing core requirement, for the first plurality of jobs. In other examples, the time threshold is five minutes, fifteen minutes, 30 minutes, or an hour. In still other examples, the time threshold is set on a dynamic or application dependent basis. In some embodiments, such timestamps are not used and, rather, the composite requirements of the queue are determined based on the jobs in the queue, irrespective of how long the jobs have been in the queue.

Referring to block 514 of FIG. 5A, in some specific nonlimiting example embodiments, each difference between the respective timestamp of a corresponding job in the first plurality of jobs and the onset of the first epic exceeds the time threshold. That is to say, in order to be part of the first plurality of jobs, in such embodiments, a respective job must have a timestamp 260 that predates the onset of the first epic by the time threshold. For instance, in one example, the time threshold is five minutes and the first plurality of jobs consists of each job 250 that has been waiting in the queue 248 for five minutes or longer.

Referring to block 516, with the first plurality of qualifying jobs identified, and the composite computer memory requirement and the composite processing core requirement therefore determined, it can further be determined whether the first plurality of jobs is memory bound (meaning that it will be more difficult or expensive to obtain sufficient nodes to handle the collective memory requirements of the plurality of jobs) or processor bound (meaning that it will be more difficult or expensive to obtain sufficient nodes to handle the collective processor requirements of the plurality of jobs). With this determination at hand, a first plurality of nodes 282 to add to a cluster during the first epic to satisfy at least a subset of the composite computer memory requirement and the composite processing core requirement is identified, with reference to blocks 516 through 540 of FIGS. 5A, 5B, and 5C as discussed in further detail below.

Referring to block 518, in some embodiments, at least one node 282 in the first plurality of nodes is a virtual machine. A virtual machine (VM) is an emulation of a computer system. Virtual machines are based on computer architectures and provide functionality of a physical computer. Their implementations involve specialized hardware, software, or a combination. In some embodiments, at least one node 282 in the first plurality of nodes is a system virtual machine (also termed full virtualization VMs), which provides a substitute for a real machine. A system virtual machine provides the functionality needed to execute an entire operating system. A hypervisor uses native execution to share and manage hardware, allowing for multiple environments which are isolated from one another, yet exist on the same physical machine. In some embodiments, a hypervisor uses hardware-assisted virtualization, virtualization-specific hardware, primarily from the host CPUs. In some embodiments at least one node 282 in the first plurality of nodes is a process virtual machine. A process virtual machines is designed to execute computer programs in a platform-independent environment. In some embodiments, at least one node 282 in the first plurality of nodes is a physical computer. In some embodiments, a physical computer is executing two or more, three or more, or four or more process virtual machines, each of which is considered a node 282. In some embodiments, each node 282 is an independent physical computer as illustrated in FIGS. 1 and 6. In some embodiments, the plurality of nodes 282 in the cluster comprises 2 or more nodes 282, 3 or more nodes 282, 5 or more nodes 282, 10 or more nodes 282, 100 or more nodes 282, or 1000 or more nodes 282. Examples of platforms that include virtual machines that can serve as nodes 282 include, but are not limited to MICROSOFT AZURE (see the Internet at azure.microsoft.com/en-us/overview/what-is-azure/) and GOOGLE Compute Engine (see the Internet at cloud.google.com/products/).

Figure 5B:
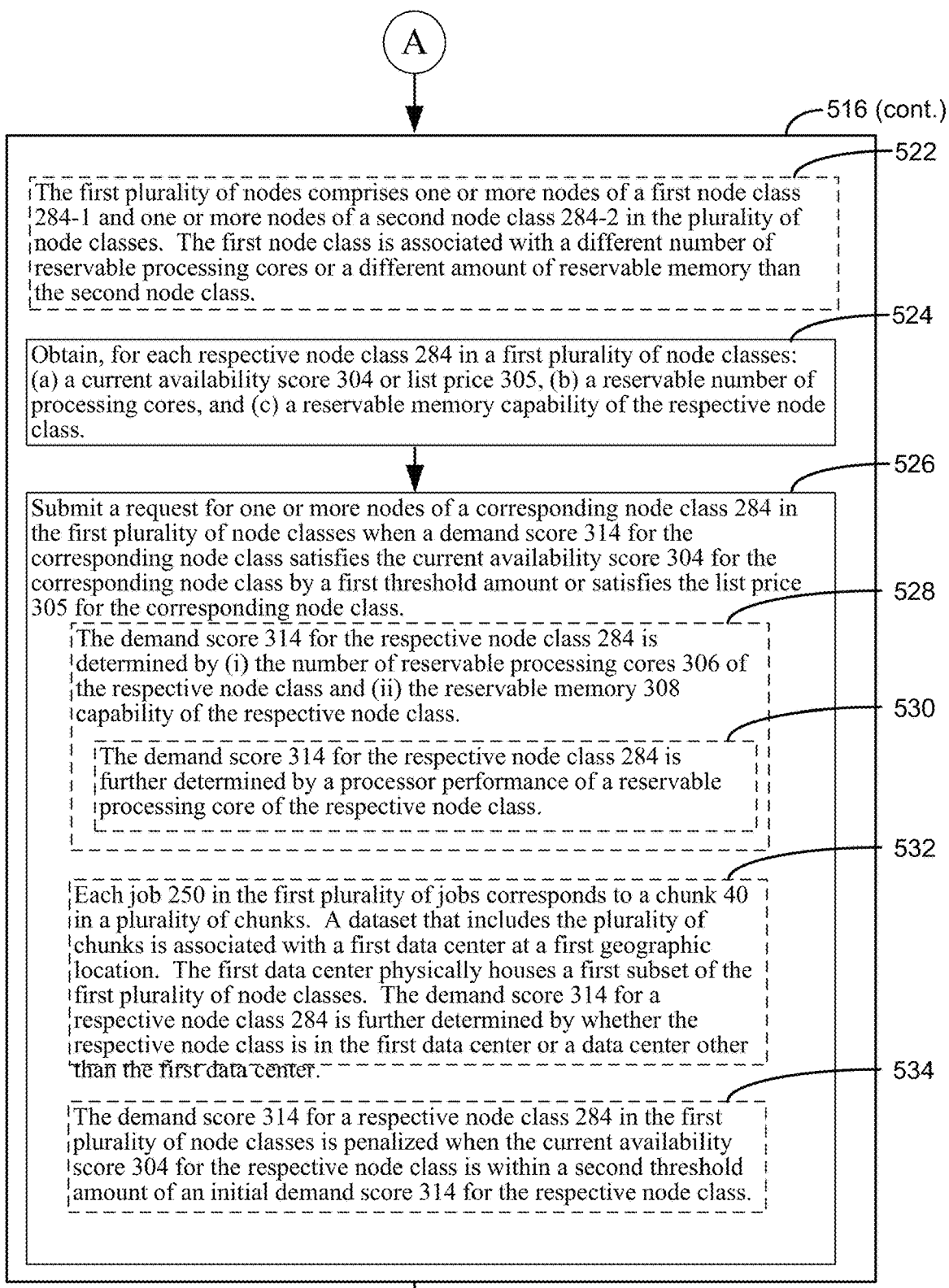

Referring block 522 of FIG. 5B, in some embodiments, the first plurality of nodes that is added during the first epic 274 to an existing cluster 110 comprises one or more nodes of a first node class 284 and one or more nodes of a second node class 284 in the plurality of node classes. For instance, the first node class is associated with a different number of reservable processing cores or a different amount of reservable memory than the second node class. Thus, in such embodiments, the identifying of block 516 is not limited to identifying nodes for the first plurality of nodes that are all the same. In such embodiments, the identifying of block 516 can select nodes of different node classes to provide for the composite computer memory requirements and/or composite processing core requirements, for the first plurality of jobs. It will be appreciated that, in typical embodiments, prior to the first epic, the cluster 110 will already include one or more nodes 282 and that the first plurality of nodes that is identified for the first epic is to be added to the one or more nodes 282 that are already in the cluster 110. Typically a first plurality of nodes is added to the cluster when a determination is made that the jobs in the queue 248 have been waiting a threshold amount of time, as discussed above.

Referring to block 524, in order to identify the first plurality of nodes to be added for the first epic, there is obtained, for each respective node class in a first plurality of node classes: (a) a current availability score 304 or a list price 305, (b) a reservable number of processing cores, and (c) a reservable memory capability of the respective node class. In typical embodiments, this information is obtained from a remote server environment, such as an environment that hosts the nodes 282 of cluster 110.

In some embodiments, the current availability score 304 for a given node class is a cost per hour for using a node of the node class at the current time. In some embodiments, the current availability score operates through a continual public bidding process and thus the current availability score for the given node class will fluctuate depending on the amount of interest in the node class presented by other bidders for nodes of the given node class. For instance, in times of great demand for the given node class, the current availability score (e.g., prices per hour for a node of the given node class) will be larger than in times of low demand for the given node class.

In some embodiments, node classes are not obtained from a competitive auction. For instance, in some embodiments, rather than participating in a competitive auction, list prices 305 rather than current availability scores 304 are obtained for node classes 284. In some such embodiments, these list prices 305 are obtained through the "List price" market such as the Amazon's reserved instances. See for example, the Internet at aws.amazon.com/ec2/pricing/reserved-instances/, which is hereby incorporated by reference.

As noted above, the obtaining procedure of block 524 further obtains the reservable number of processing cores and reservable memory capability of the respective node class.

Referring to block 526, in some embodiments, a request for one or more nodes 250 of a corresponding node class in the first plurality of node classes is made when a demand score for the corresponding node class satisfies the current availability score for the corresponding node class by a first threshold amount. In some embodiments, where the evaluation of the composite computer memory requirement and the composite processing core requirement suggests that the first plurality of jobs is memory bound, only the composite computer memory requirement is considered when computing this demand score. In some embodiments, where the evaluation of the composite computer memory requirement and the composite processing core requirement suggests that the first plurality of jobs is processor bound, only the composite computer processor requirement is considered when computing this demand score. In some embodiments, referring to block 528 and FIG. 3A, the calculated demand score 314 for the respective node class 284 is determined by (i) the number of reservable processing cores 306 of the respective node class 284 and (ii) the reservable memory capability 308 of the respective node class.

In some embodiments, where the evaluation of the composite computer memory requirement and the composite processing core requirement suggests that the first plurality of jobs is processor bound, the calculated demand score 314 for the respective node class 284 is determined by the number of reservable processing cores 306 of the respective node class 284 and not the reservable memory capability 308 of the respective node class.

In some embodiments, where the evaluation of the composite computer memory requirement and the composite processing core requirement suggests that the first plurality of jobs is memory bound, the calculated demand score 314 for the respective node class 284 is determined by the reservable memory capability 308 of the respective node class and not the number of reservable processing cores 306 of the respective node class 284.

Referring to block 530 of FIG. 5B, in some embodiments, the demand score 314 for the respective node class 284 is further determined by a processor performance of a reservable processing core of the respective node class 284. For instance, higher speed or higher performance processors positively influences the calculated demand score 314, whereas lower speed or lower performance processors negatively influence the calculated demand score 314 in some embodiments.

Referring to block 534 of FIG. 5B, and also referring to FIG. 6, in some embodiments each job 250 in the first plurality of jobs corresponds to a chunk 40 in a plurality of chunks. Further, a dataset that includes the plurality of chunks is associated with a first data center at a first geographic location 690. The first data center physically houses a first subset of the first plurality of node classes. The demand score 314 for a respective node class 284 is further determined by whether the respective node class 284 is in the first data center (geographic location 690) or a data center other than the first data center. That is, a premium is added to the demand score 314 when the chunk 40 and the node class 284 are at the same geographic location 690 in such embodiments because any respective job 250 running on the node class 284 that is at the same geographic location 690 as the chunk 40 needed for the respective job 250 will be able to access the chunk 40 faster than a respective job running on a node class 284 that is associated with a different geographic location than its corresponding chunk 40. Correspondingly, a penalty is imposed on the demand score 314 when the chunk 40 and the node class 284 are at different geographic locations 690 in such embodiments.

Referring to block 534 of FIG. 5B, in some embodiments, the demand score 314 for a respective node class 284 in the first plurality of node classes is penalized when the current availability score 304 for the respective node class 284 is within a second threshold amount of an initial demand score 314 for the respective node class. This second threshold amount is different than the first threshold amount and is used in instances where the calculated demand score 314 is very close to (within the second threshold amount of) the currently availability score 304. In such situations, the risk that the current availability score 304 will go over budget after jobs 250 are initiated on nodes 282 of the node class 284 associated with the current availability score 304 become appreciable, particularly if other users bid up the current availability score 304 for the node class. Thus, to prevent such situations, embodiments in accordance with block 534 impose a penalty on the demand score 314 when it is close to the current availability score 304.

As noted above, with respect to block 526, in some embodiments a request for one or more nodes of a corresponding node class 284 in the first plurality of node classes is made when a demand score 314 for the corresponding node class satisfies the list price 305 for the corresponding node class. In some such embodiments, current availability scores 304 are not used to make a request. In some such embodiments, current availability scores 304 are used. That is, in such embodiments, a request for one or more nodes of a corresponding node class 284 in the first plurality of node classes is made either (i) when a demand score 314 for the corresponding node class satisfies the current availability score 304 for the corresponding node class by a first threshold amount or (ii) when a demand score 314 for the corresponding node class satisfies the list price 305 for the corresponding node class.

Figure 5C:
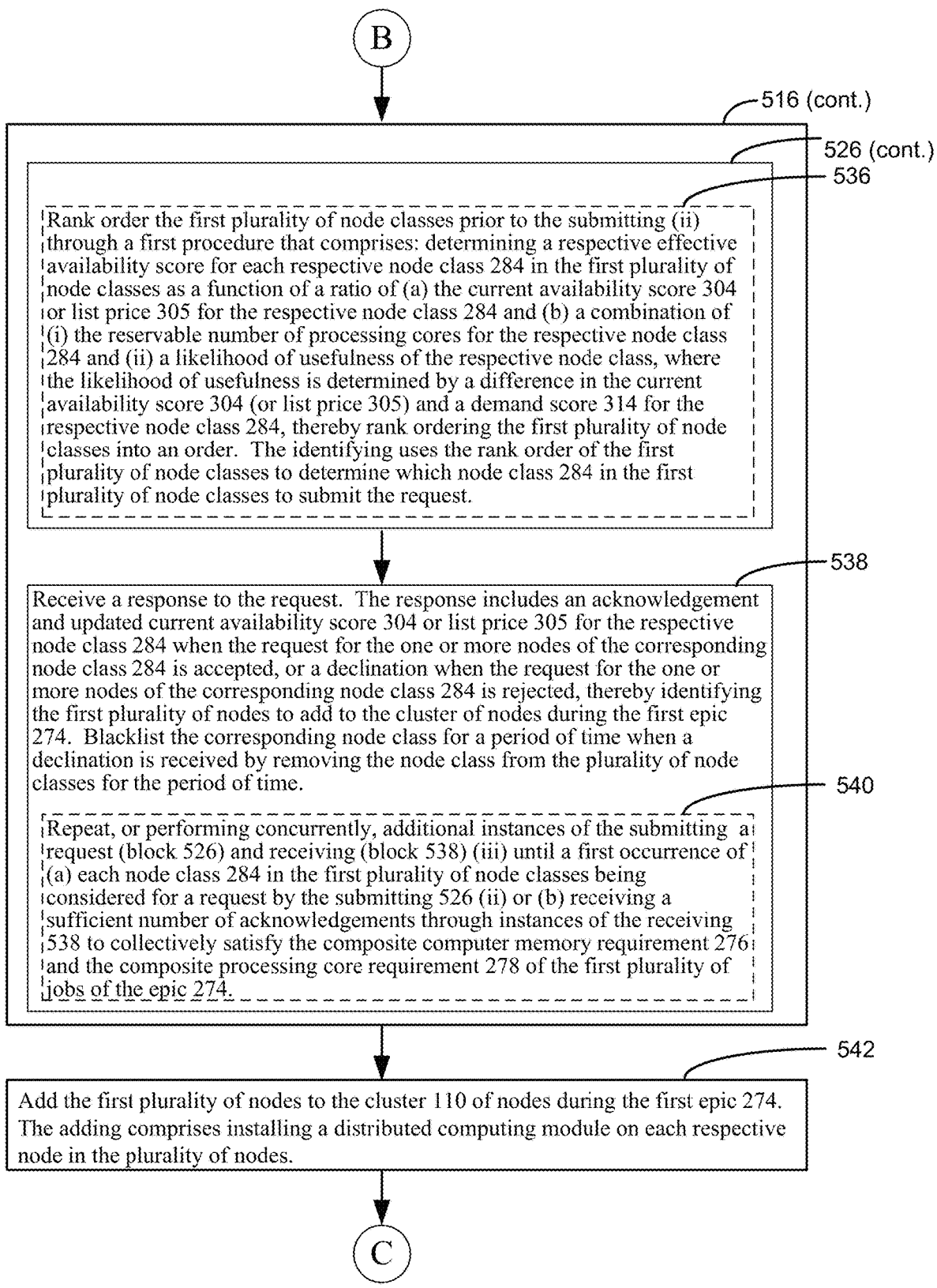

Referring to block 536 of FIG. 5C, with the currently availability scores 304 and/or list prices 305 and calculated demand scores 314 in hand for each node class 284 in the list of available node classes 288, in some embodiments, the first plurality of node classes 284 (list of available node classes 288) is rank ordered prior to submitting a request for nodes 250 of a certain node class 284. In some embodiments, this rank ordering is accomplished by a first procedure that comprises determining a respective effective availability score for each respective node class 284 in the first plurality of node classes. That is, the node classes in the first plurality of node classes are each assigned an effective availability score and these effective availability scores are used to rank order the list. Then, nodes in those node classes at the beginning of the list are requested before requesting nodes in node classes lower down in the rank order.

Rank Order from Low to High.

In some embodiments, the rank order is from low to high, meaning that respective node classes with lower effective availability scores receive priority, in terms of making node requests to the respective node classes, than node classes with higher effective availability scores.

In some such embodiments the effective availability score for a respective node class 284 is the ratio between numerator (a) and denominator (b), where numerator (a) comprises the current availability score 304 for the respective node class 284 and denominator (b) comprises the combination of (i) the reservable number of processing cores for the respective node class 284 and (ii) a likelihood of usefulness of the respective node class.

In some such embodiments the effective availability score for a respective node class 284 is the ratio between numerator (a) and denominator (b), where numerator (a) comprises the list price 305 for the respective node class 284 and denominator (b) is the combination of (i) the reservable number of processing cores for the respective node class 284 and (ii) a likelihood of usefulness of the respective node class.

In some embodiments, the likelihood of usefulness is determined by a difference in the current availability score 304 and a demand score 314 for the respective node class. Thus, in such embodiments, the higher the current availability score 304 of a respective node class, the higher the effective availability score is for the respective node class and thus the lower the priority is to make requests for nodes of the respective node classes. Moreover, in such embodiments, the higher the number of reservable processing cores of a respective node class, the lower the effective availability score is for the respective node class and thus the higher the priority is to make requests for nodes of the respective node classes. Moreover, in such embodiments, the lower the likelihood of usefulness of a respective node class, the higher the effective availability score is for the respective node class and thus the lower the priority is to make requests for nodes of the respective node classes.

In some embodiments, the likelihood of usefulness is determined by a difference in the list price 305 and a demand score 314 for the respective node class. Thus, in such embodiments, the higher the list price 305 of a respective node class, the higher the effective availability score is for the respective node class and thus the lower the priority is to make requests for nodes of the respective node classes. Moreover, in such embodiments, the higher the number of reservable processing cores of a respective node class, the lower the effective availability score is for the respective node class and thus the higher the priority is to make requests for nodes of the respective node classes. Moreover, in such embodiments, the lower the likelihood of usefulness of a respective node class, the higher the effective availability score is for the respective node class and thus the lower the priority is to make requests for nodes of the respective node classes.

Rank Order from High to Low.

In some embodiments, the rank order is from high to low, meaning that respective node classes with higher effective availability scores receive priority, in terms of making node requests to the respective node classes, than node classes with lower effective availability scores.

In some such embodiments the effective availability score for a respective node class 284 is the ratio between numerator (a) and denominator (b), where numerator (a) comprises a combination of (i) the reservable number of processing cores for the respective node class 284 and (ii) a likelihood of usefulness of the respective node class and denominator (b) comprises the current availability score 304 for the respective node class 284.

In some such embodiments the effective availability score for a respective node class 284 is the ratio between numerator (a) and denominator (b), where numerator (a) comprises a combination of (i) the reservable number of processing cores for the respective node class 284 and (ii) a likelihood of usefulness of the respective node class and denominator (b) comprises the list price 305 for the respective node class 284.

In some such embodiments, the likelihood of usefulness is determined by a difference in the current availability score 304 and a demand score 314 for the respective node class. Thus, in such embodiments, the higher the current availability score 304 of a respective node class, the lower the effective availability score is for the respective node class and thus the lower the priority is to make requests for nodes of the respective node classes. Moreover, in such embodiments, the higher the number of reservable processing cores of a respective node class, the higher the effective availability score is for the respective node class and thus the higher the priority is to make requests for nodes of the respective node classes. Moreover, in such embodiments, the lower the likelihood of usefulness of a respective node class, the lower the effective availability score is for the respective node class and thus the lower the priority is to make requests for nodes of the respective node classes.

In some such embodiments, the likelihood of usefulness is determined by a difference in the list price 305 and a demand score 314 for the respective node class. Thus, in such embodiments, the higher the current list price 305 of a respective node class, the lower the effective availability score is for the respective node class and thus the lower the priority is to make requests for nodes of the respective node classes. Moreover, in such embodiments, the higher the number of reservable processing cores of a respective node class, the higher the effective availability score is for the respective node class and thus the higher the priority is to make requests for nodes of the respective node classes. Moreover, in such embodiments, the lower the likelihood of usefulness of a respective node class, the lower the effective availability score is for the respective node class and thus the lower the priority is to make requests for nodes of the respective node classes.

In some embodiments, rather than using the reservable number of processing cores for the respective node class 284, the amount of reservable memory of the respective node class 248 is used instead, particularly if the plurality of jobs is memory bound.

Thus, the first plurality of node classes 284 is ranked in an order. In some such embodiments, this rank order of the first plurality of node classes is used to determine which node class 284 in the first plurality of node classes to submit a request. Accordingly, requests for nodes of a given node class are made. In some embodiments, requests for nodes of more than one node class are made.

Referring to block 538 of FIG. 5C, a response to a request is received. In some embodiments, the response includes an acknowledgement and updated current availability score 304 or list price 305 for the respective node class 284 when the request for the one or more nodes 250 of the corresponding node class 284 is accepted. Alternatively, the response includes a declination when the request for the one or more nodes 250 of the corresponding node class 284 is rejected. In some embodiments, rather than relying on such responses, successful requests include the autonomous installation of the job management module 646 on a respective node, and the job management module 646 alerts the queue module 244 of the successful addition to the cluster. For instance, in some embodiments, the queue module 244 of a first node that has been added to the queue alerts the queue module 244 of the successful addition to the cluster by creating a host directory in the shared file system or database hosted by the application server 102 and writing a corresponding node status file in the host directory for the first node. In such embodiments, the job management module 646 updates the status of the first node in the cluster by updating the node status file corresponding to the first node based. In some embodiments the corresponding node class is blacklisted for a period of time when a declination is received. In some such embodiments, such blacklisting involves removing the node class from the plurality of node classes for the period of time (e.g., between one half hour and five hours, between one hour and four hours, between ninety minutes and three hours, or between 10 minutes and one hour).

Through such requests and optional responses, the first plurality of nodes to add to the cluster 110 of nodes during the first epic 274 is determined. For instance, referring to block 540, additional instances of the submitting a request (block 526) and receiving (block 538) are repeated or preformed concurrently until a first occurrence of (a) each node class 284 in the first plurality of node classes being considered for a request by the requesting (block 526) or (b) receiving a sufficient number of acknowledgements through instances of the receiving (block 538) to collectively satisfy the composite computer memory requirement 376 and the composite processing core requirement 278 of the first plurality of jobs. In some embodiments, before the entirety of the composite computer memory requirement 376 and the composite processing core requirement 278 of the first plurality of jobs is satisfied, a collective budget is matched or exceeded by the nodes in the cluster 110 and/or by the nodes in the cluster 110 and the nodes that have been identified for addition to the cluster. That is, the collective current availability score of the nodes in the cluster combined with the current availability score of the nodes about to be added to the cluster exceed a collective budget. In some instances, the collective budget is an overall maximum cost per unit of time that can be expended on the nodes. In such instances, if the collective current availability score of the nodes in the cluster combined with the current availability score of the nodes about to be added to the cluster exceeds the maximum cost per unit of time (e.g., cost per hour), then no further nodes are identified for addition to the cluster during the present epic even in instances where the composite computer memory requirement 376 and the composite processing core requirement 278 of the first plurality of jobs is determined to not be satisfied by the nodes identified for addition to the cluster during the epic. In this way, it is possible to impose an overall budget (e.g., cost per hour) on cluster 110 that is independent of current user demand, as exhibited by the composite computer memory requirement 376 and/or the composite processing core requirement 278 of the first plurality of jobs.

Referring to block 542 of FIG. 5C, once the first plurality of nodes has been identified, they are added to the cluster 110 of nodes during the first epic. In some embodiments, the addition of the first plurality of nodes to the cluster comprises installing a distributed computing module on each node 282 in the first plurality of nodes. In some embodiments, the addition of the first plurality of nodes to the cluster comprises installing a distributed computing module on at least one node 282 in the first plurality of nodes.

In some embodiments, the distributed computing module is job management module 646 of FIG. 6. As such, job management module 646 represents an example of a distributed computing module in accordance with the present disclosure.

In some embodiments, the distributed computing module installed on a respective node in the plurality of nodes is an image. In some embodiments the image is a system image meaning that it is a serialized copy of the entire state of a computer system (node) stored in a non-volatile form such as a file. In some such embodiments the image comprises an operating system that is run on a node 282. In some embodiments, the image further comprises instructions for acquiring from a remote location (e.g., from the application server 102) one or more programs required to run all or a portion of a job in the plurality of jobs on a respective node 282. In some such embodiments, the remote location is a file system that is shared by the cluster prior to installing the distributed computing module on each node in the plurality of nodes.

In some embodiments, the image further comprises a software module that is configured to execute all or a portion of a job in the plurality of jobs.

In some embodiments, the image further comprises a plurality of software modules, where the plurality of software modules is collectively configured to execute each job in the plurality of jobs. In some such embodiments, the image installed on a node include an operating system and all the software that will be run on the node in accordance with jobs in the plurality of jobs. In other embodiments, the image installed on a node includes a naive operating system and coordinates access to the software that is required, e.g., by retrieving such software form a remote location and installing it on the node when the node is tasked with running a job I the plurality of jobs that needs the software.

Referring to block 544 of FIG. 5D, each respective node 250 in the cluster 110 of nodes is granted a draw privilege. The draw privilege permits a respective node to draw one or more jobs 250 from the queue 248 during the first epic subject to a constraint that the collective computer memory requirements and processing core requirements of the one or more jobs collectively drawn by a respective node 250 in the cluster 110 of nodes does not exceed a number of reservable processing cores and a reservable memory capability of the respective node. For instance, if the number of reservable processing cores of the respective node is 4, then the collective processing core requirement of the jobs drawn by the respective node must be 4 or less. As an example, if a first job requires 1 thread, a second job requires 3 threads, and a third job requires 5 threads, and the number of reservable processing cores of the respective node is 4, the respective node can draw the first and second jobs, but not the third job. This example illustrates a feature of the systems and methods of the present disclosure: a node in the cluster 110 of nodes can draw more than one job from the queue for concurrent execution on the node (e.g., during the first epic).

Referring to block 546, in some embodiments respective node 282 in the cluster 110 that has the draw privilege draws a job 250 from the queue 248 when the respective node 282 has an availability of reservable memory and reservable processing cores by reserving the job in the queue with the oldest timestamp 260 subject to the constraint that the job 250 can be handled by the available reservable memory and reservable processing cores of the respective node. In some embodiments, each node that has such draw privileges independently draws nodes from the queue. In some embodiments, such draw requests occur on a randomized basis. That is, each node makes recurring, but nonperiodic draw requests. In some embodiments, the nonperiodic time period is generated using a random number generator. In this way, the load of draw requests is evenly distributed across the nodes in the cluster 110.

In some embodiments, for a first node 282 in the first plurality of nodes, the installed distributed computing module executes a procedure comprising scanning the queue in accordance with the draw privilege, thereby identifying the one or more jobs from the queue. In some embodiments, the computing system comprises a pending jobs directory that is shared by all the nodes 282 in the cluster. For instance, the jobs directory is hosted by application server 102. In such embodiments, a job definition file is written in the pending jobs directory for each respective job in the queue. Further, in such embodiments, the addition of a respective node to the cluster comprises creating a corresponding host directory for the respective node and writing a corresponding node status file in the corresponding host directory for the respective node. In some such embodiments, the distributed computing module (e.g. job management module 646) of a first node moves the job definition file of a first job in the queue from the pending jobs directory to the host directory corresponding to the first node when the respective distributed computing module draws the job from the queue for execution on the first node thereby preventing other nodes in the cluster from taking the job.

In some embodiments, the distributed computing module (e.g., job management module 646) running on a respective node further comprises executing one or more jobs 250 on the respective node, tracking progress of the one or more job 250, tracking resource utilization of the one or more jobs while the one or more jobs are executing, and reporting to the application server 102 on the resource utilization of the one or more job. In some embodiments, the distributed computing module (e.g., job management module 646) running on a respective node further comprises installing one or more software applications on the respective node that are capable of executing the one or more jobs the distributed computing module reserves for the respective node from the queue.

In some embodiments, a respective node 282 includes an operating system and the distributed computing module (e.g., job management module 646) alters, adjusts, or changes one or more parameters of the operating system. For instance, in some embodiments, a respective node 282 includes an operating system and the distributed computing module (e.g., job management module 646) alters, adjusts, or changes one or more kernel parameters of the operating system, such as shmmax (the maximum size, in bytes, of a single shared memory segment), shmmni (how many shared memory segments can be on the node), shmall, shmmin (the minimum size, in bytes, of a single shared memory segment), shmseg (the maximum number of shared memory segments that can be attached by a single process), semmsl, semmns, semopm, semmni, file-max, ip_localport_range or shmmns (the amount of shared memory that can be allocated node wide for the jobs), See, for example, the Internet at access.redhat.com/documentation, which is hereby incorporated by reference, for information on Linux kernel parameters. In some embodiments, the distributed computing module (e.g., job management module 646) on a respective node 282 configures access for respective node to an authentication mechanism such as a lightweight directory access protocol mechanism. For example information on lightweight directory access protocol mechanism, see the Internet at en.wikipedia.org/wiki/Lightweight_Directory_Access_Protocol, which is hereby incorporated by reference. In some embodiments, the distributed computing module (e.g., job management module 646) on a respective node 282 configures a network resource (shared resource) such as one or more publically available database, one or more databases that are shared by the cluster of nodes, one or more file systems that are shared by the cluster of nodes, one or more hardware devices that can be accessed by individual nodes of the cluster (e.g., printers, scanners, measurement devices) through the use of shared connection. In some embodiments, the distributed computing module (e.g., job management module 646) on a respective node 282 in the cluster configures the respective node in accordance with a continuous integration/continuous deployment tool such Ansisble. See, for example, the Internet at ansible.com/application-deployment, which is hereby incorporated by reference. In some embodiments, the distributed computing module (e.g., job management module 646) is acquired by each node 282 in the first plurality of nodes from a file system that is shared by the cluster (e.g., stored in memory 207) prior to installing the distributed computing module (e.g., job management module 646) on each node 282 in the plurality of nodes.

Thus, a method of distributed computing has been disclosed with reference to blocks 502 through 546. What follows are additional features that are found in some embodiments of the present disclosure. Towards this end, referring to block 548, in some embodiments, each respective job 250 in the first plurality of jobs is associated with an originating user identifier 258. In such embodiments, the method further comprises associating the originating user 258 of a first job in the first plurality of jobs with all or a portion of the updated current availability score 304 or list price 305 of the node class 284 of the respective node that draws the first job in the first plurality of jobs. In this way, it is possible to track the computational resources that have been used by a given user 258. FIG. 4F illustrates. For each respective user 258 across a query period, summary module 246 can provide the number of jobs the user submitted 420 during the query period, the job hours 422 consumed during the query period, the reserved job hours 424 made during the query period, the CPU hours 428 expended during the query period, the CPU utilization 428 during the query period, the amount of memory reserved during the query period (expressed, for example, as reserved gigabyte-hours 430), the amount of memory used during the query period (expressed, for example, as used gigabyte-hours 432), and the memory utilization 434 during the query period.

Referring to block 550 of FIG. 5D, in some instances, a job 250 reserves (specifies) an entirety of the reservable memory or an entirety of the reservable processing cores of the respective node 282 that it is run on. In such instances, the associating of block 548 associates the originating user 258 with all of the updated current availability score 304 or list price 305 of the node class 284 of the respective node. This is because the originating user is using the entirety of the reservable computational resources of the node 282. Alternatively, referring to block 552, in other instances, a job 250 reserves a fraction of the reservable memory or a fraction of the reservable processing cores of the respective node 282 that it is run on. In such instances, the associating of block 548 associates the originating user 258 with a corresponding fraction of the updated currently availability score 304 of the node class 284 of the respective node 282. This is because the originating user is using a fraction of the reservable computational resources of the node 282.

Blocks 502 through 552 have discussed what takes place in a single epic 274 in accordance with some embodiments of the present disclosure. However, system 100 is active over several epics. At the completion of one epic 274, another epic 274 begins. Each epic 274 generally includes the same processes of queue inspection, load determination, and node reservation, disclosed above in relation to blocks 2 through 252. However, it is not always the case that additional nodes will be added to the cluster 110 during an epic 274. For instance, referring to block 556, in some embodiments, for a second epic in the plurality of epics occurring immediately after the first epic: responsive to identifying fewer jobs 250 in the queue 248 than can be serviced by the cluster 110, a privilege of one or more nodes 282 in the cluster to draw further jobs from the queue is terminated. This is because the cluster 110 is deemed to have excess computational resources, from both a memory-bound and processor-bound perspective. Thus, in order to lower the overall cost of the computing system, some nodes 282 are released from the cluster 110. In some embodiments, such nodes are released from the cluster only after they have completed any remaining jobs. In some embodiments, such nodes are released from the cluster immediately before completing any remaining jobs.

Block 556 illustrates the embodiment, where, for a second epic 274 in the plurality of epics occurring before the first epic, an updated current availability score 304 is obtained for each node class 284 for one or more nodes 282 in the cluster. Responsive to determining that the updated current availability score 304 for a respective node class 284 exceeds a first limiter, a privilege of each node 282 in the cluster of the respective node class 284 to draw jobs from the queue 284 is terminated. This embodiment, for example, handles situations in which the current availability score has been determined to exceeds a certain cost per unit of time (e.g., cost per hour). In some embodiments, the first limiter is the calculated demand score 314 discussed above. In some embodiments, the first limiter is some function of the demand score 314 discussed above, such as 1.2 times the demand score 314 (e.g., current availability score 304 is allowed to drift up over time so long as it does not exceed 1.2 times the original demand score 314. In some embodiments, the first limiter is 1.1 times the original demand score 314, 1.2 times the original demand score 314, between 1.05 and 3.00 times the original demand score 314, or some other limiter that serves to ensure that nodes will be removed from the cluster when their current availability score starts to exceed the original price that was offered for the nodes. It will be appreciated that once a node starts to draw jobs from the cluster, it is worthwhile to allow the node to complete such jobs. Thus, provided the current availability score of the node does not exceed the first limiter, the node is allowed to continue to draw jobs from the queue.

Block 558 of FIG. 5D represents the situation in which the current availability score in a given epic has risen beyond a second limiter, where the second limiter represent a certain cost that warrants immediate termination of the node in order to enforce and maintain the overall budget for the computing system 100. In block 558, responsive to determining that the updated current availability score 304 for a respective node class 284 exceeds a second limiter, the queue module 244 immediately terminate each node 282 in the cluster 110 of the respective node class 284 from the cluster 110. This occurs before the respective nodes that are so terminated have a chance to complete the jobs that they are running.

Figure 4A:
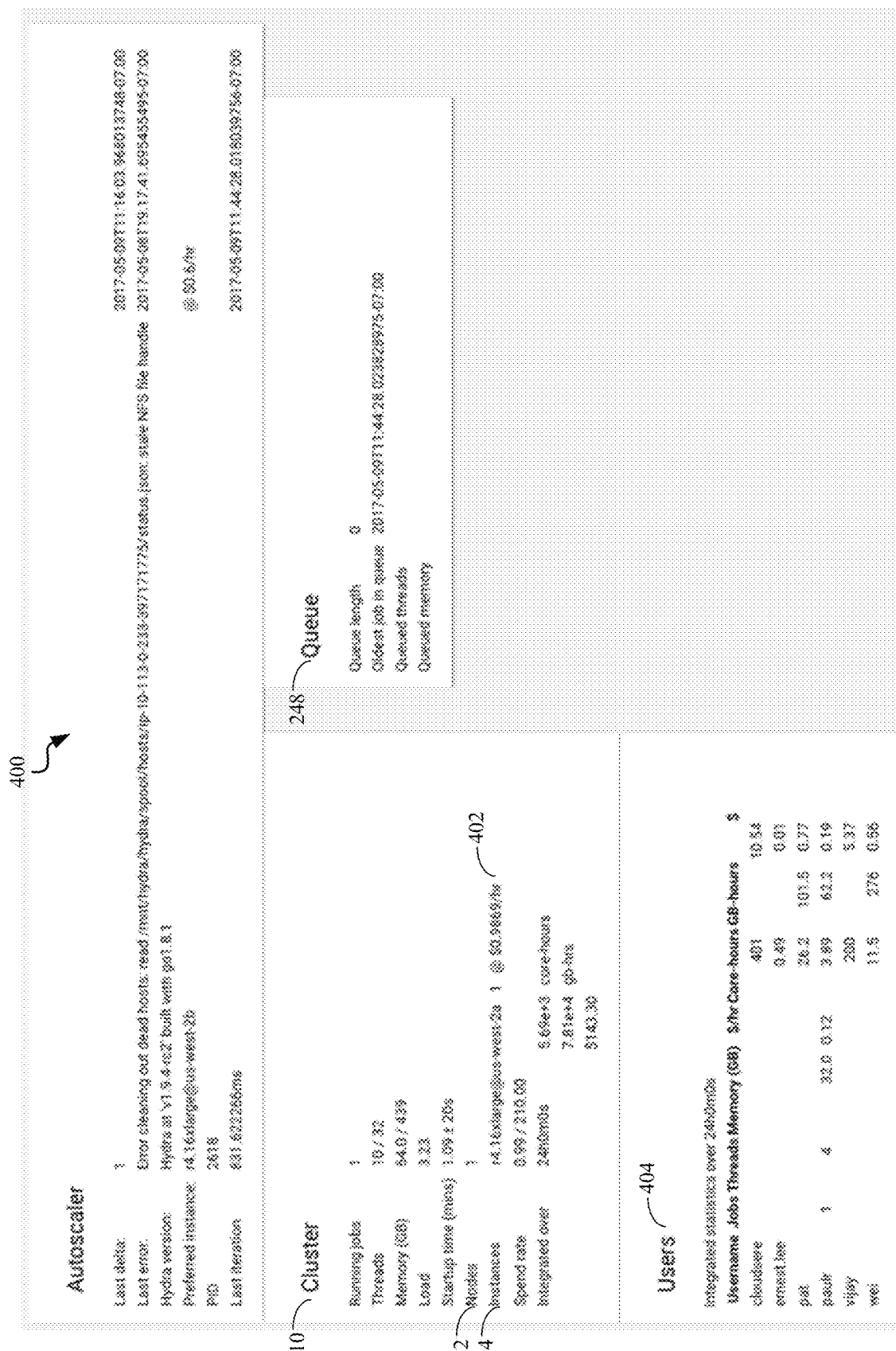
Figure 4B:
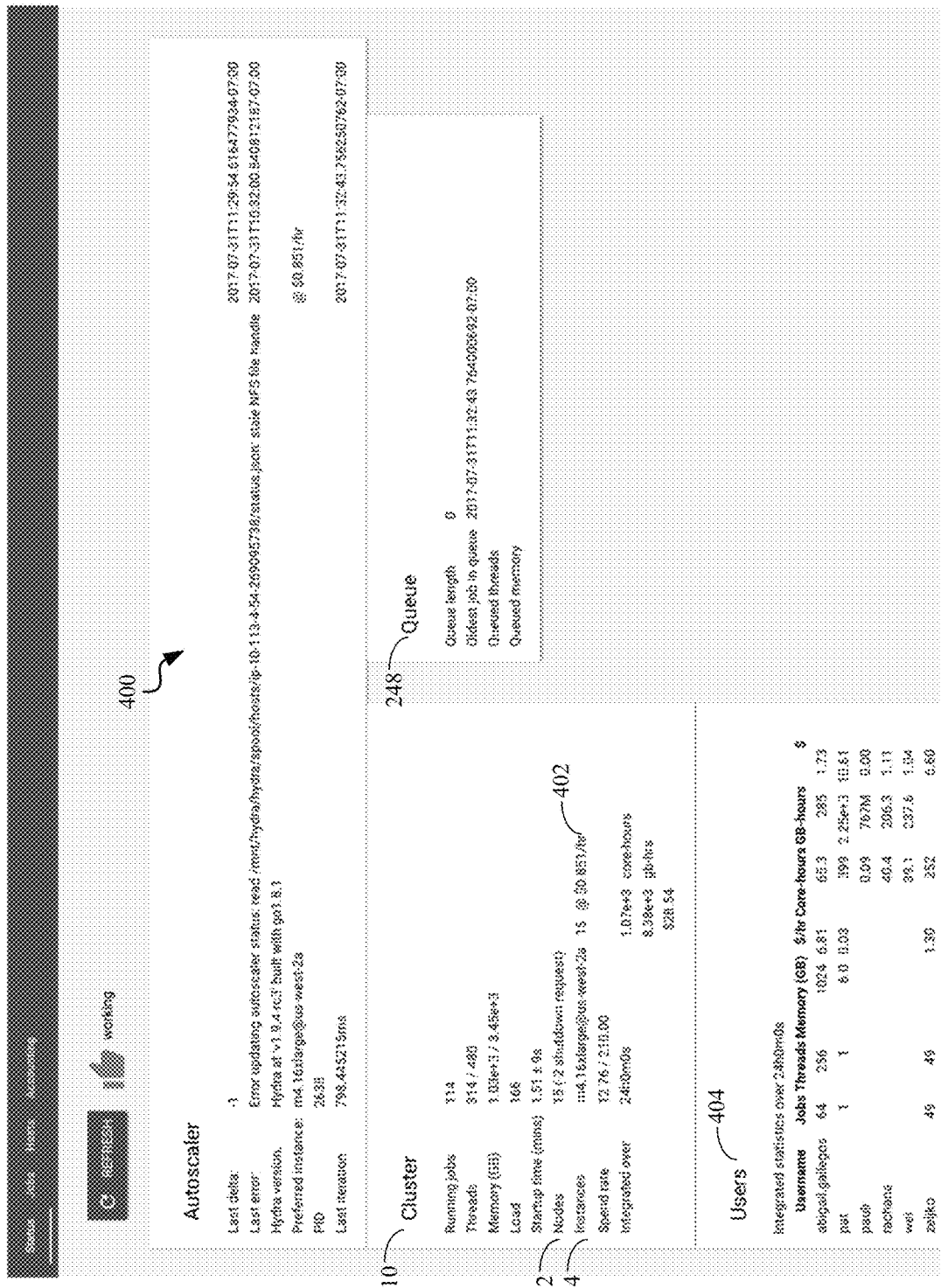
Figure 4C:
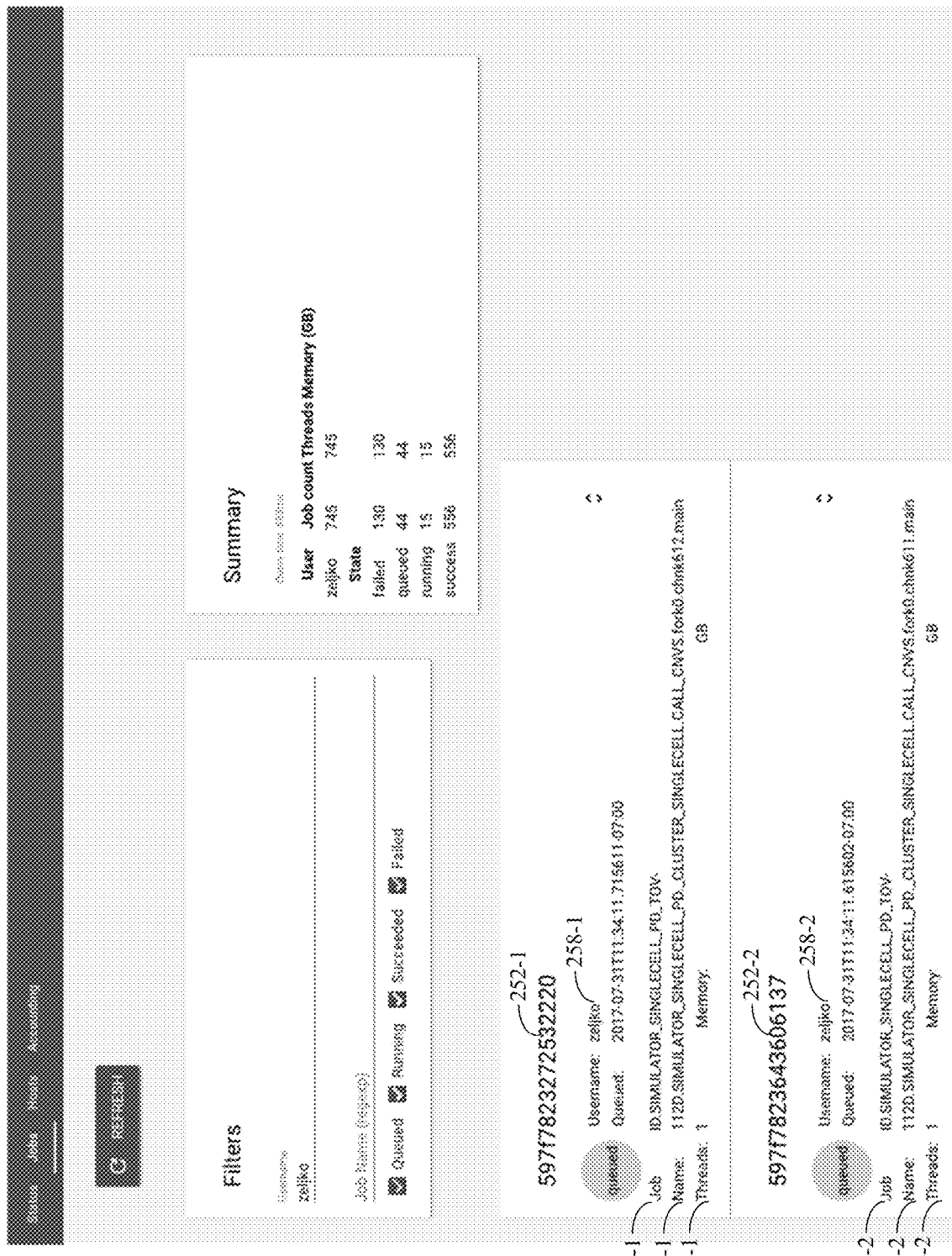
Figure 4D:
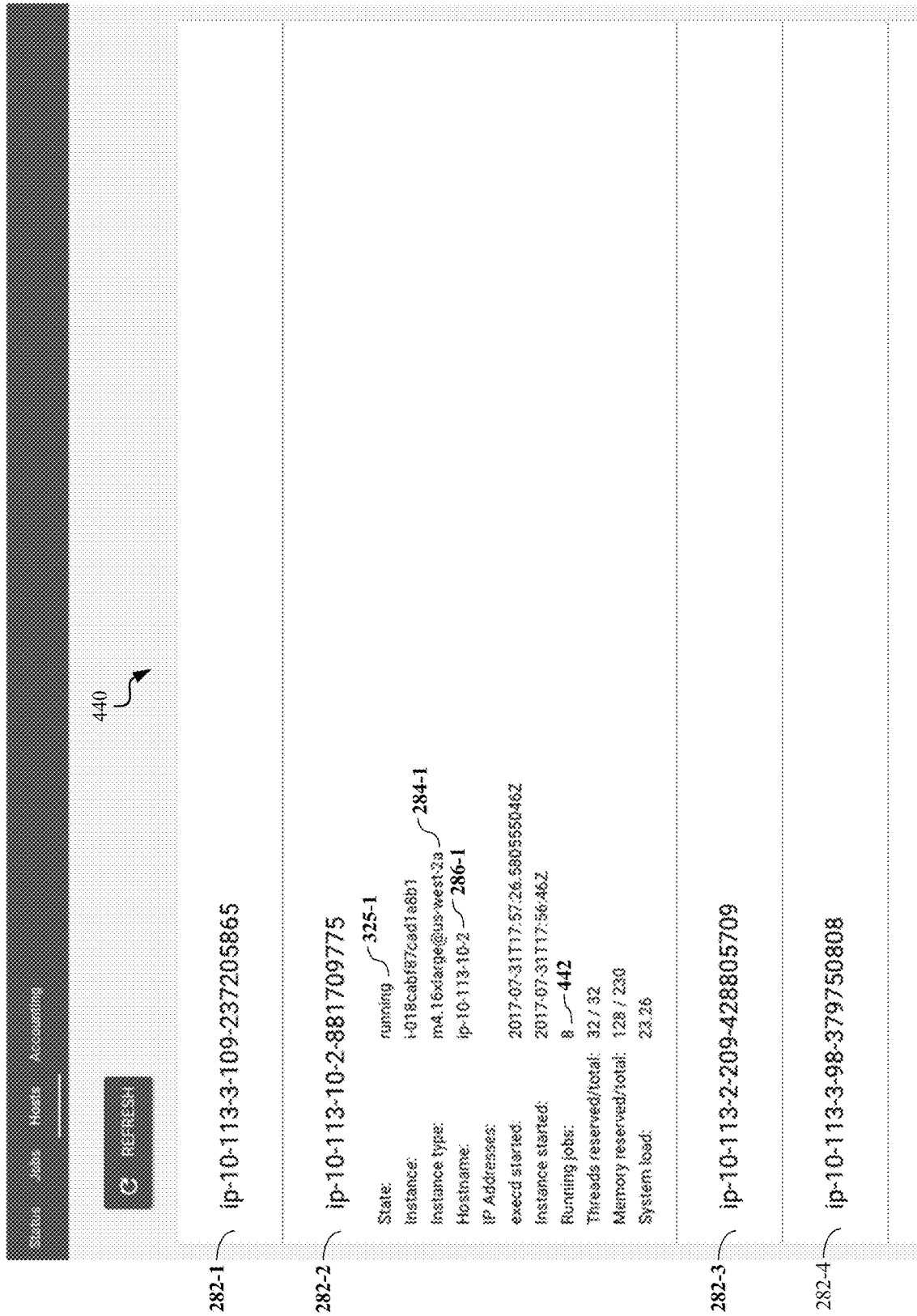
Figure 4E:
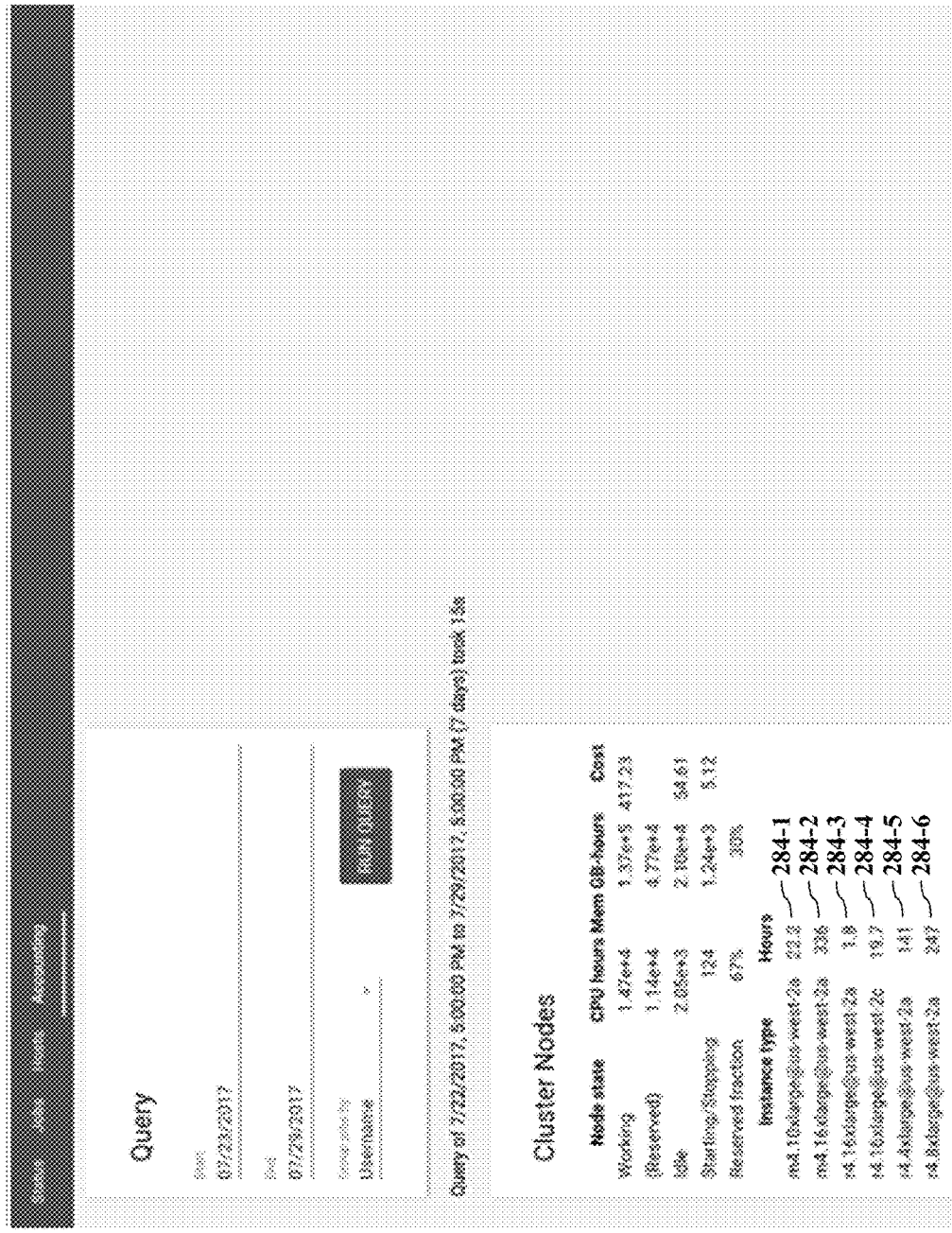
Figure 4F:
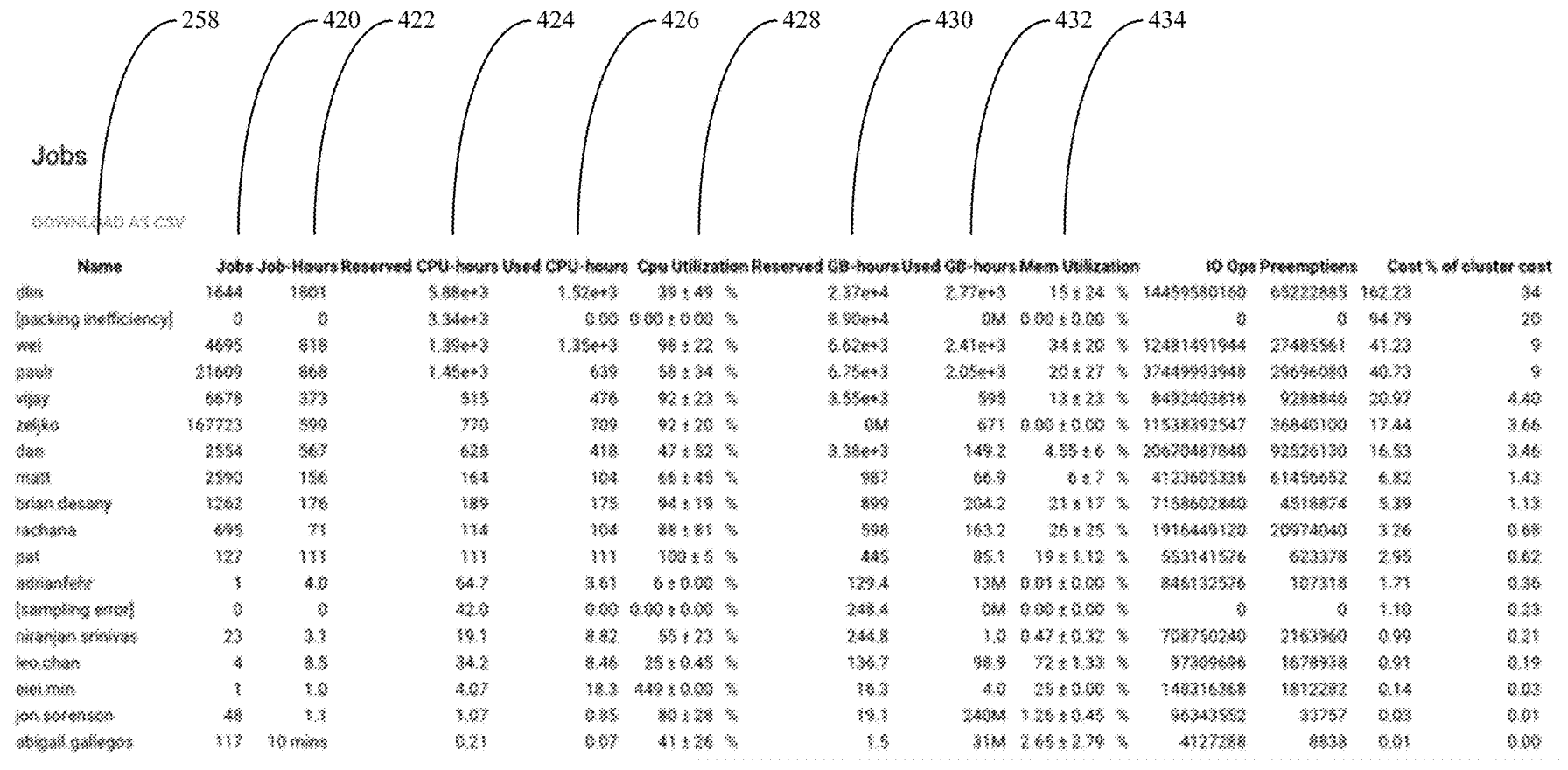

Referring to block 560 of FIG. 5E, in some embodiments, the disclosed systems and methods display a summary of the node cluster 110 during a given epic 274. In some embodiments, summary module 246 provides this node summary. In some embodiments, the node summary specifies, for each respective node in the node cluster, how many jobs drawn from the queue that the respective node is presently executing. Panel 440 of FIG. 4D illustrates. For each respective node 282 in the node cluster 110, panel 440 lists out how many jobs the queue that the respective node is presently executing 442. As further illustrated in panel 440, in some embodiments, the summary further specifies a current state 325 of the respective node, the instance type 284 of the respective node 282, a host name 286 of the respective node, the number of thread reserved by the jobs 250 running on the node, the total number of reservable threads (processing cords) on the node, the amount of memory collectively reserved by the jobs 250 running on the node (e.g., in gigabytes of RAM memory), and the total amount of memory that is reservable on the node (e.g., in gigabytes of RAM memory).

In some embodiments, a file system is used to track jobs 250. For instance, referring to block 562 of FIG. 5E, in some embodiments the memory 207 of application server 102 comprises a pending jobs directory and the method further comprises writing a job definition file 250 in the pending jobs directory for each respective job in the queue. As used herein, because the job definition file 250 has a one to one correspondence with a unique corresponding job 250, the term "job 250" and "job definition file" is given the same element. It will be appreciated that a job definition file defines a corresponding job. Referring to FIG. 2, in some embodiments, the job definition 250 includes an account associated with the job 256, a user name 258 of the submitter of the job, a timestamp 260 of when the job was submitted to the queue 248, a timestamp 262 of when the job was drawn by a node 282 in the cluster 110, a timestamp 264 of when the job was completed by the cluster 110, a number 266 of processing cores required by the job, a memory required by the job 268, a job script and/or algorithm 269, a node identifier 270 that indicates which node 282 in the cluster 110 has drawn the job or completed the job, and/or a job exit code 272 which is assigned to the job by the node 282 upon completion of the job. In some embodiments, database equivalents are used for the pending jobs directory. That is, rather than creating a pending jobs directory, a database stores each job definition file in the queue.

Referring to block 564 of FIG. 5E, as well as FIGS. 2 and 3A, in some embodiments, the memory 207 further comprises a succeeded jobs directory 290. In such embodiments, the corresponding job definition file 250 of each respective job that has been completed by a node 282 in the cluster 110 is moved from the to the succeeded jobs directory 290. In alternative embodiments, database equivalents are used for the succeeded jobs directory whereby the corresponding job definition file 250 of each respective job that has been completed by a node 282 in the cluster 110 is indexed in one or more database data structures as successfully being completed.

Referring to block 566 of FIG. 5E, as well as FIGS. 2 and 3A, in some embodiments, the memory 207 further comprises a failed jobs directory 294. In such embodiments, the disclosed systems and methods further comprise moving the corresponding job definition file of each respective job 250 that has been initiated but unsuccessfully completed by the cluster 110 to the failed jobs directory 294 and writing a corresponding error report 320 for the respective job to the failed jobs directory 294. In alternative embodiments, database equivalents are used for the failed jobs directory whereby the corresponding job definition file 250 of each respective job that has failed is indexed in one or more database data structures as failing.

Block 568. In accordance with block 568, in some embodiments the adding further comprises: creating a respective host directory for each respective node in the first plurality of nodes thereby creating a plurality of host directories, and writing a corresponding node status file in the corresponding host directory for each respective node in the first plurality of nodes. The method further comprises: updating a status of each respective node in the cluster by updating the node status file corresponding to the respective node based upon a status received from the respective node and moving the job definition file of a job in the queue from the pending jobs directory to the host directory corresponding to a respective node in the cluster when the respective node draws the job from the queue.

Block 570 discloses another embodiment that makes use of a file system to track jobs 250. In accordance with block 570 of FIG. 5E, and as illustrated in FIG. 3B, a respective host directory 320 is created for each respective node 282 in the first plurality of nodes that is added to the queue 248 during the first epic, thereby creating a plurality of host directories corresponding to the plurality of first nodes. Further, a corresponding node status file 322 is written in the corresponding host directory 320 for each respective node 282 in the first plurality of nodes. In such embodiments, the method further comprises updating a status of each respective node 282 in the cluster 110 by updating the node status file 322 corresponding to the respective node 282 based upon a status received from the respective node 282. Moreover, when the respective node 282 draws a job 250 from the queue 248, the job definition file 250 of the respective job in the queue is moved from the pending jobs directory to the host directory 320 corresponding to the respective node 282. In alternative embodiments, database equivalents are used for the host directories, pending directory, pending job directory, and failed jobs directory whereby the corresponding job definition file 250 of each respective job having any of these categories is accordingly indexed in one or more database data structures.

Referring to block 572, of FIG. 5E and as illustrated in FIG. 3A, in some embodiments the memory 207 further comprises a failed jobs directory 294. In such embodiments, the disclosed systems and method further comprises, responsive to determining that a respective node 282 in the cluster 110 has failed to update its status (e.g., state 325) in the node status file 322 corresponding to the respective node 282 within a second time-out period, moving the job definition file 250 of each respective job 250 that is in the host directory 320 corresponding to the respective node 282 into the failed jobs directory 292 and removing the respective node 282 from the cluster. This second time-out period is calibrated to ensure that if the status is not updated in the status file within the second time-out period, there is appreciable confidence that the corresponding node has become unresponsive to the point where it is no longer worth the calculated demand score 314.

Referring to block 574 of FIG. 5F, and as further illustrated in FIG. 3B, in some embodiments, the status that is written to the node status file 322 comprises any combination of a state of the corresponding node 324, a timestamp (e.g., state entry timestamp 326), a remaining number of reservable number of processing cores that is currently available on the corresponding node 328, a remaining amount of reservable memory that is currently available on the corresponding node 330, a total number of reservable number of processing cores that is available on the corresponding node 332 (some of which may be currently being used by jobs 250), a total amount of reservable memory that is available on the corresponding node 332 (some of which may be currently being used by jobs 250), and an instance identifier 270 for the respective node. In some embodiments, summary module 246 (FIG. 2) uses the information in the node status file 322 is to provide the summary panel 440 of FIG. 4D.

Referring to block 576, in some embodiments the cluster 110 is configurable between a permissive status and a non-permissive status. When the cluster 110 is in the permissive status, the adding of nodes is permitted in accordance with the disclosure presented above (e.g., blocks 502 through 542). When the cluster is in the non-permissive status, the adding is not permitted. In some such embodiments, when the cluster is in the non-permissive status and a first job 250 in the queue 248 has been in the queue for more than a predetermined amount of time, the method further comprises: moving the job definition file 250 of the first job in the queue 248 from the pending jobs directory to the host directory 320 corresponding to a respective node 282 in the cluster 110 that is most likely able to handle the first job first. Moreover, the draw privilege of the respective node is revoked until the respective node has completed the first job. This ensures that the job will get done. In some embodiments, the The bidding process disclosed above with reference generally to blocks 502 through 578 provides mechanisms for obtaining the best nodes in a cluster to match current job demand. However, in some instances, a job requires more threads (processing cores) or more memory than is reservable in any one of the existing nodes in the cluster (even in such nodes had no other jobs running), and moreover, the bidding process disclosed in blocks 502 through 578 fails to add a node to the queue that can handle the intensive resource requirements of such a job. Accordingly, referring to block 578 of FIG. 5F, in some embodiments, responsive to determining that the cluster 110 does not include a node 282 that has a sufficient amount of reservable memory or a sufficient amount of reservable processing cores to handle a first job in the queue 248 that requires the greatest amount of memory or the most number of processing cores: a request for a node 282 that has sufficient amount of reservable memory or a sufficient amount of reservable processing cores to handle the first job is made and the node is added to the cluster. In other words, the bidding process described above in which node classes are rank ordered based on effective availability score is bypassed for this intensive job so that a node 282 that has sufficient reservable memory and/or sufficient reservable processing cores to service the job is added to the cluster 110.

Referring to block 580 of FIG. 5F, in some embodiments the cluster 110 is configurable between a permissive status and a non-permissive status. In such embodiments, the disclosed systems and method further comprise obtaining, on a recurring basis, for each respective node 282 in the cluster 110, a current availability score 304 or list price 305 of the respective node. There is further computed, on the recurring basis, a total availability score for the cluster as a summation of each respective current availability score 304 or list price 305 of each node in the cluster. In such embodiments, the cluster is permitted to be in the permissive status when the total availability score is less than a first predetermined limiter. Moreover, the cluster is required to be in the non-permissive status when the total availability score exceeds the first predetermined limiter in such embodiments. When the cluster is in the permissive status, the adding, disclosed generally above with reference to blocks 502 through 542 is permitted. When the cluster is in the non-permissive status, the adding is not permitted. For instance, as an example, in some embodiments the first predetermined limiter is a predetermined cost per unit of hour, such as a predetermined cost per hour. When this global predetermined cost per hour is exceeded by the existing cluster 110, no further nodes can be added to the cluster until the cost per hour of the cluster goes below the global predetermined cost per hour.

Figure 5G:
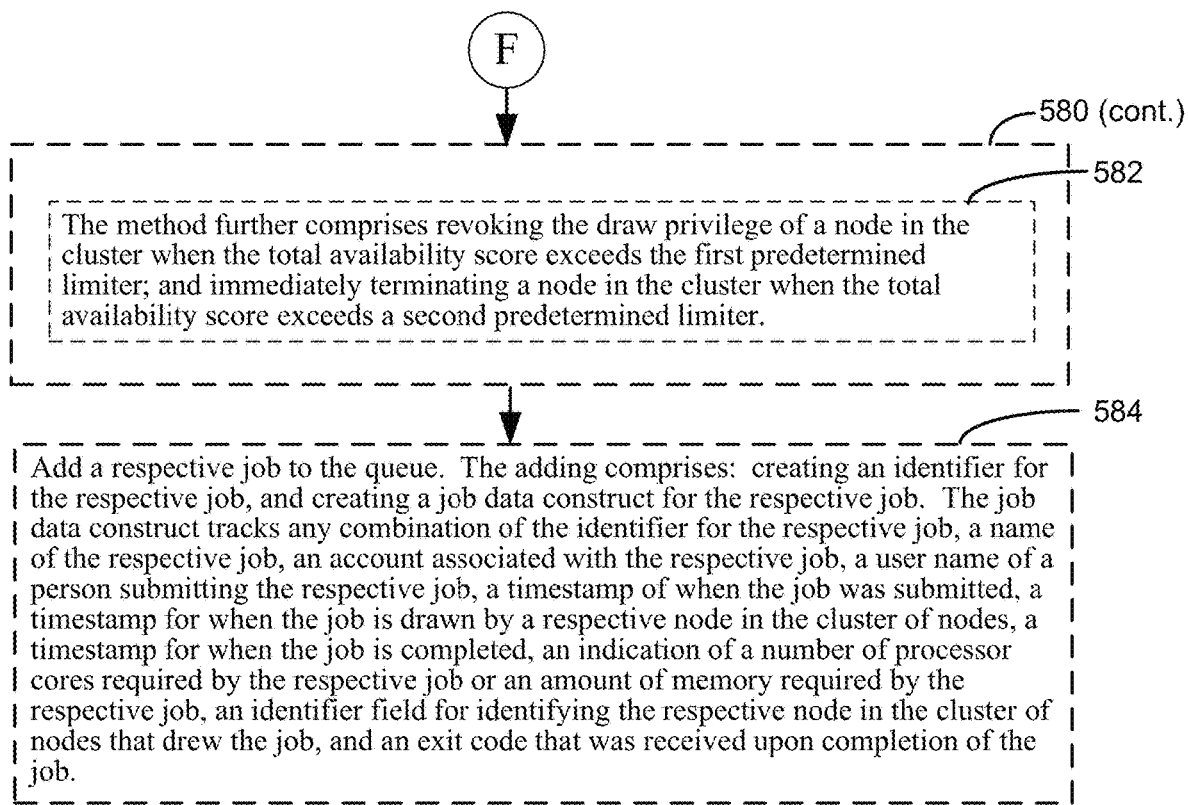

Referring to block 582 of FIG. 5G, in some embodiments of block 580, in the case where the total availability score exceeds the first predetermined limiter, the draw privilege of a node in the cluster is revoked. Moreover, in the case where the total availability score exceeds a second predetermined limiter, a node in the cluster is immediately terminated from the cluster 110. The first case, where the total availability score exceeds the first predetermined limiter warrants a soft elimination of nodes from the cluster. In this first case, the total cost of the cluster is exceeding an allowed value (the first predetermined limiter), but not the second predetermined limiter. As such, a node slated for elimination is first allowed to complete its jobs prior to elimination. The node is not allowed to draw new jobs however. In the second case, the total cost of the cluster is exceeding an allowed value of the second predetermined limiter. As such, a node slated for elimination is required to terminate from the cluster 110 immediately without waiting for it to complete its drawn jobs. This second case arises, for example, when the cost for the cluster 110 exceeds the second predetermined limiter.

Referring to block 584 of FIG. 5G, and as further illustrates in FIGS. 2 and 6, in some embodiments a respective job is added to the queue by creating an identifier for the respective job, and creating a job data construct (e.g., job definition 250) for the respective job 250. The job data construct tracks any combination of the identifier 252 for the respective job, a name 254 of the respective job, an account 256 associated with the respective job, a user name 258 of a person submitting the respective job, a timestamp of when the job was submitted 260, a timestamp for when the job is drawn 262 by a respective node in the cluster of nodes, a timestamp for when the job is completed 264, an indication of a number of processor cores 266 required by the respective job or an amount of memory 268 required by the respective job, an identifier field 270 for identifying the respective node in the cluster of nodes that drew the job, and an exit code 272 (e.g., terminated with errors, termination successful, etc.) that was received upon completion of the job.

Example Embodiment

One motivation for the disclosed systems and methods is that conventional distributed computing environments, such as SGE were not designed with cloud computing in mind. In particular, setting up new nodes and removing old or preempted nodes is complicated. Ensuring nodes are configured consistently is also difficult.

In some embodiments of the present disclosure, thousands of potentially heterogeneous nodes 282 can be included in a cluster, the cluster 110 can be dynamically resized (in terms of the number of nodes and types of nodes in the cluster), and ephemeral nodes 282 (AWS spot nodes, GCE preemptable nodes) can be handled cleanly. The disclosed systems and methods advantageously provide minimal configuration and management overhead, and provide simple basis for monitoring. In some embodiments, the systems and methods of the present disclosure support a state-based machine configuration, e.g. for mounting additional drives, setting up symlinks, installing packages on nodes 282. In some embodiments, the systems and method provide for the autodiscovery of the cluster 110 configuration when compute nodes 282 come up (are added to the cluster 110).

In some embodiments, the central coordination medium used by the queue module 244 is network file system (NFS). NFS is a distributed file system protocol that allows a user to access files over the communications network 104 much like local storage is accessed. NFS builds on the Open Network Computing Remote Procedure Call (ONC RPC) system. NFS is defined in Request for Comments 1813, NFS Version 3 Protocol Specification, Network Working Group, Callaghan et al., June 1995, available on the Internet at tools.ietf.org/html/rfc1813, which is hereby incorporated by reference. NFS supports the transactional semantics, such as mv, and support the scale supported in some embodiments of the present disclosure.

In some embodiments, when a node 282 is added to the cluster 110, it creates a corresponding node host directory 320 in the coordination directory and writes a node status file 322 with its configuration information into that directory. When a job 250 is submitted to the queue 248, a job definition file 250 is written to the pending job directory associated with a queue. A compute node 282, seeing this job definition file, moves the file into its own node host directory 320 to claim it. In some embodiments, NFS semantics ensure only one compute node 282 will be able to claim the job 250 this way. The job 250 is run to completion on the corresponding node 282 and then the job 250 is moved to a succeeded jobs directory/folder 290.

In some embodiments of the present disclosure, the queue module 244 supports a qsub command. The qsub command captures a job script (command line or stdin) 250 as well as environment (including current user and working directory) and writes them to the appropriate place in the pending job directory 248.

In some embodiments of the present disclosure, the computing system 100 provides a compute node host process (execd), running on a respective node 282, which scans the queue (pending job directory 248) for jobs 250 for the respective node 282 to do and claims jobs for the respective node as appropriate. This process also periodically writes and updates the node status file 322 for the respective node. In some embodiments, this process is also responsible for maintaining and monitoring the machine state of the respective node.

In some embodiments of the present disclosure, the computing system 100 provides a job host, which consumes a job definition file 250 as generated by qsub and runs the actual work on a node 282. This process captures standard output and standard error into appropriate files on the node 282 and monitors the job on the node 282. This process moves the job file 250 into the succeeded job directory (folder) 290 or the failed jobs directory (folder) 294 as appropriate upon termination of the corresponding job.

In some embodiments of the present disclosure, the computing system 100 provides a cluster janitor that monitors node status files 322. If one of them is too old, the cluster janitor moves all the running jobs 250 for that node 282 to the failed state (e.g. to the failed jobs directory 294).

In some embodiments of the present disclosure, the computing system 100 provides a qstat process that finds all of the job definition files 250 in the queue 248 (e.g., pending job directory) and displays their state. In some embodiments, the qstat process is provided by summary module 246.

In some embodiments of the present disclosure, the computing system 100 provides a qdel process that finds the job definition file 250 for a desired job 250 and moves it from wherever it is to the failed jobs directory 294 if the job has not started running on a node 282 yet. If the job 250 has started running on a node 282, the qdel process writes a termination request file to the job working directory (e.g., node host directory 320) of the corresponding node 282.

In some embodiments of the present disclosure, the computing system 100 provides a ghost process that finds all the node status files 322 of all nodes 282 that are presently in the cluster 110 and displays their information.

In some embodiments of the present disclosure, the computing system 100 provides an autoscaler process that inspects the load on nodes 282 in the cluster 110 and pending (unclaimed) jobs in the queue 248 and decides when to start up new nodes 282 (e.g., add new nodes to the cluster 110) or direct existing nodes 282 to shut down (e.g., remove nodes 282 from the cluster 110).

In some embodiments of the present disclosure, the computing system 100 provides coordination directory structure and the root of the coordination folder is relied upon by qsub or the compute node host in order to start. In some embodiments, there are also configuration files with additional options or overrides. In some embodiments the coordination directory structure has the structure illustrated in FIG. 7. In such embodiments, job definition files 250 are created in the job backing store and hard-linked to the pending jobs directory, from which they are moved elsewhere. The backing store directory thus serves as a listing of all job ids.

In some embodiments, the pending jobs directory 248 is writeable by users who can submit jobs 250. The claimed and running work directories are writeable by users who can cancel jobs. The machine state file is writeable by users who can change machine state. The other directories and files are writeable by the user under which the cluster management daemons run, but are readable by any user who is permitted to monitor cluster status.

In some embodiments, scheduling is done on an almost entirely distributed basis. If a node 282 with the janitor or autoscaler goes down, the distributed computing environment is maintained: nodes 282 autonomously look for work, greedily claiming the oldest job from the pending job directory 248 that they are able to accept at any time. Provided that more nodes 282 can be added to the cluster 110 when the queue 248 backs up, this result in jobs getting eventually scheduled.

In the event that a cap on new nodes 282 being added has been reached, a situation may arise where, for example, all the nodes 282 in the cluster 110 are running one processor unit jobs 250 and there is an eight processor unit job 250 waiting in the queue 248, but no node 282 has 8 processors free. In that case the forcible scheduler, which is part of the autoscaler in some embodiments, can just forcibly move the job definition file 250 for this job into the claimed directory of one of the nodes 282 in the cluster 110. Then that node 282 will not claim any new work from the queue 248 until after it has been able to start running that job.

In some embodiments of the present disclosure, the computing system 100 provides a janitor whose job is to clean up dead nodes 282. If a node 282 has failed, it will stop updating its status file 322. When this happens, on a relatively short timeout the janitor will move work out of the claimed directory of the node 282 and back into the pending directory 248. On a much longer timeout, jobs are marked as failed and the presumed dead nodes 282 are explicitly terminated from the cluster 110 when running on AWS or GCE. Furthermore, the janitor is responsible for detecting nodes 282 which should be up within the cluster 110 (e.g. they are costing money in AWS or GCE) but have not written to their node status file 322. Additionally, in some embodiments, the janitor process has the job of deleting job result directories from the succeeded 290 and failed directories 294 after a configurable amount of time or number of jobs 250 in the history. This prevents the files associated with old jobs eventually overwhelming the file system. In some embodiments, the janitor also checks the job backing store directory for older jobs which have an inode link count of one and removes them. In some embodiments, the disclosed janitor functions are provided by queue module 244 of FIG. 2.

In some embodiments, the disclosed systems and method provide an autoscaler that manage the number of nodes 282 and types of nodes in the cluster 110. If there is a pending job 250 and there is no node in the cluster 110 that has the resources needed to run the job (e.g. a job needs 256 gigabytes of random access memory and none of the nodes 282 have more than 160 gigabytes of reservable memory) then the autoscaler will start a node 282 large enough for that job. If the oldest job 250 has been sitting in the queue 248 for too long, then the autoscaler will start up one or more nodes with enough resources to run the jobs in the queue. If the total amount of unutilized resources in the cluster 110 is more than the size of a compute node 282, the autoscaler will shut down a node. If the oldest pending job in the queue 248 is older than some jobs which are currently running, after a while, and the autoscaler cannot start up a new node 282, the autoscaler will assign the job to whichever node 282 in the cluster 110 that seems most likely to have the resources to run it soonest.

In some embodiments, the disclosed functionality of the autoscaler is encompassed within the queue module 246 of FIG. 2.

In some embodiments, the autoscaler is responsible for provisioning new hosts 282, and also for configuring them when they come up, including mounting the coordination directory and starting the node host daemon In some embodiments, when the autoscaler wants to shut down a host, it does so by generating a shutdown job. In some embodiments, there are two kinds of shutdown jobs 250, "soft" and "hard". Soft shutdown of jobs is handled like a regular job which requires an entire node 282 to run (but doesn't explicitly call out the node size). If left in the queue, this job will shut down the next node 282 that becomes idle. This is advantageous when new jobs 250 are not being generated. If new jobs 250 are being generated but the free capacity of the cluster 110 is spread over several nodes 282 within the cluster, the autoscaler can move the soft shutdown job into the claimed directory for one of the nodes 282 just as it does with normal jobs when the greedy scheduling fails.

If a node 282 needs to be shut down as soon as possible (for example on AWS if the spot price rises too high to support such a large cluster 110) a hard shutdown job can be generated and assigned to a node 282, which will terminate its running jobs and shut down immediately thereby removing the node from the cluster 110. In some such embodiments, this shut down includes unclaiming jobs and cleaning files generated by such job in the manner disclosed above with respect to the janitor, as well as setting an offline state in the host status file 322 for the node 282. Depending on configuration, it will either just shut down the compute node host executable, shut down the machine (the node 282), or even terminate the AWS or GCE instance In some embodiments, the autoscaler will publish an http application programming interface for debugging its internal state, changing parameters, and inspecting the cluster state (number of running jobs, etc.) In some embodiments, the autoscaler has three budgets defined, in terms of units of currency per hour. There is a target budget, a soft spend limit, and a hard spend limit. If the costs of a node 282 are fixed, the target budget controls. New nodes 282 will not be started if that would put the total cluster spend above the target budget. The soft spend limit is the limit at which nodes 282 start getting soft shutdown signals. It is configured somewhere above the target budget to provide some hysteresis in the node 282 count within the cluster 110 in the face of changes in instance cost. The hard limit is somewhat higher to account for the expected value of allowing jobs 250 on a node 282 to complete rather than forcing them to immediately fail. By way of example, consider the case of a target budget of $5/hour, a soft limit of $6/hour, and a hard limit of $7/hour. Further still, the spot price for a compute node 282 is $0.50/hour. If the cluster 110 is at full load, ten nodes will start up. Later, the spot price increases to $0.65/hour. One node 282 will get a soft shutdown signal, but will be allowed to finish running jobs 250 before shutting down, bringing the number of nodes to nine and the total cluster spend down to $5.85. Then consider the case where the spot price goes up to $1/hour. Two nodes will get a hard shutdown message, killing any running jobs, and one will get a soft shutdown, bringing the spend immediately down to $7 and eventually to $6

In some embodiments, the disclosed systems and methods provide a job host that starts up with a job definition and has several requirements. The job host monitors the host status file. If that times out, implying that the corresponding compute node host executable has failed, the job 250 must be terminated or else the cluster 110 will be in an inconsistent state when the janitor comes around and decides the host node 282 has failed. The job host further collect monitoring information for the job 250 processes, e.g. CPU and memory usage. The job host handles success or failure of a job 250, moving the job directory into the appropriate location in the coordination directory (e.g., the succeeded jobs directory 290 or the failed jobs directory 294) once the process completes. In some embodiments, the job host further checks for a job termination request (from qdel) and terminates the job 250 if requested. In some embodiments, the job host also sets up the user and environment for the job script to run in. In some embodiments, all or a portion of the disclosed functionality of the job host is incorporated into the queue module 244.

In some embodiments, the disclosed systems and methods provide a compute node host (execd). The compute node host starts up with a configuration which tells it the location of the coordination root directory and other information such as shutdown behavior and resource availability information (which is auto-discovered in some embodiments). In some embodiments execd overrides such auto-discovery (e.g., if the host is running as an SGE job). Upon startup, the host generates a unique host session name, generally the machine name plus startup timestamp. It generates a directory by that name with subdirectories for claimed and running jobs, and writes its status file into that directory. In the main loop of the node host, it checks whether child jobs are still running and updates its available capacity accordingly. It updates the corresponding node status file 322. It looks for work in the pending directory 248 to move into the claimed directory until either the consumable resources of the corresponding node 282 are exhausted or there are no more pending jobs available. In some embodiments the compute node host runs the machine state manager. Next the compute node host scans the node's claimed directory for work. If it can start that work it does so. The compute node then writes to the status file 322 again. The compute node then sleeps until the next iteration. In some embodiments, the sleep amount is somewhat randomized to prevent too many hosts hammering the NFS directory concurrently. At the end of each job loop iteration, the compute host logs various metrics that can be plotted over time, such as CPU usage, free memory on the corresponding node 282, reserved resources on the corresponding node 282, and so forth. In some embodiments the node host also collects additional system logs such as dmsg. When executing work, in some embodiments, the node host creates a subdirectory directory in the running jobs directory with the same name as the job definition. Then it moves the job definition into that directory and invokes the job host to actually run it. Before starting a job 250, the compute node host checks that the current machine state is at least as recent as the machine state definition specified in the job definition 250. If the order of operations above is followed, that is already guaranteed so long as the NFS server guarantees total store ordering. In some embodiments, the node host exposes an http application programming interface for debugging. In some embodiments, any or all of the disclosed functionality of the compute node host is within the job management module 646 illustrated in FIG. 6.

In some embodiments, the disclosed systems and methods provide a machine state manager. The machine state manager is designed to run as part of the compute node host. The machine state file specifies a list of desired states. In some embodiments, these states include Symlinks, NFS mounts, NFS exports, System packages (yum or apt), and running daemons. In some embodiments, this is an ordered list, so items later in the list are permitted to depend on items earlier in the list (e.g. a symlink my need an NFS mount first). In some embodiments, the machine state file resides in the coordination root directory of the corresponding node 282. When the machine state manager detects a change, it copies the machine state file to the local configuration directory as a pending machine state. In some embodiments, the machine state manager is responsible for examining the current machine state and determining how to transition into the pending one. In some embodiments, the current machine state file is not trusted as a source of truth by the state manager. Once the transition is complete, it moves the pending state file to overwrite the current state file. In the event of an error it logs the error to the host's subdirectory of the coordination directory and tries again later.

In some embodiments, a job definition 250 specifies a job script, an environment, a working directory, a location to write stdout and stderr for the job, a uid to run as, and a machine state file version. In some embodiments, a job definition specifies any resources (CPU 266, memory 268) that the job 250 requires. Optionally the job definition provides a job name 256. In some embodiments, job identifiers 252 are not sequential like they are in SGE, because there is not a central point of coordination. In some embodiments, a process such as tmpfile( ) or equivalent is used to ensure unique job identifiers 252.

In some embodiments, and referring to FIG. 3B and FIG. 6, the node status file 322 is a JSON file comprising the last time the file was written (326) written into the file. If the last written time was more than a few minutes ago, in some embodiments the corresponding node 282 will be considered possibly down and will not be consider to be available for scheduling from the autoscaler's point of view. If the last written time was a long time ago (several hours at least) it is safe to consider the corresponding node 282 dead in some embodiment. In such instances, the node is terminated and the jobs 250 running on the node 282 are assumed failed. In some embodiments, the node status file 322 further comprises the node state 325 (starting up, started, terminated). In some embodiments, nodes 282 still starting up should not have jobs 250 scheduled to them, but it is still important to know they exist in some embodiments. In some embodiments, nodes 282 which are shutting down can say so in order to more promptly let the autoscaler know about it. In some embodiments, the node status file 322 further includes the total number of threads and memory available on the corresponding nodes 282. In some embodiments, the node status file 322 further includes the remaining unreserved threads 328 and memory 330 available on the machine. This is used to determine idle capacity for purposes of scheduling and the autoscaler. In some embodiments, the node status file 322 further includes the instance identifier 270 for the nodes in case the autoscaler needs to terminate it, and also to ensure that all the nodes 282 that are being paid for are actually processing jobs 250.

CONCLUSION

All references cited herein are incorporated herein by reference in their entirety and for all purposes to the same extent as if each individual publication or patent or patent application was specifically and individually indicated to be incorporated by reference in its entirety for all purposes.

Plural instances may be provided for components, operations or structures described herein as a single instance. Boundaries between various components, operations, and data stores are somewhat arbitrary, and particular operations are illustrated in the context of specific illustrative configurations. Other forms of functionality are envisioned and may fall within the scope of the implementation(s). In general, structures and functionality presented as separate components in the example configurations may be implemented as a combined structure or component. Similarly, structures and functionality presented as a single component may be implemented as separate components. These and other variations, modifications, additions, and improvements fall within the scope of the implementation(s).

It will also be understood that, although the terms "first," "second," etc. may be used herein to describe various elements, these elements should not be limited by these terms. These terms are only used to distinguish one element from another. For example, a first mark could be termed a second mark, and, similarly, a second mark could be termed a first mark, without changing the meaning of the description, so long as all occurrences of the "first mark" are renamed consistently and all occurrences of the "second mark" are renamed consistently. The first mark, and the second mark are both marks, but they are not the same mark.

The terminology used herein is for the purpose of describing particular implementations only and is not intended to be limiting of the claims. As used in the description of the implementations and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined (that a stated condition precedent is true)" or "if (a stated condition precedent is true)" or "when (a stated condition precedent is true)" may be construed to mean "upon determining" or "in response to determining" or "in accordance with a determination" or "upon detecting" or "in response to detecting" that the stated condition precedent is true, depending on the context.

The foregoing description included example systems, methods, techniques, instruction sequences, and computing node program products that embody illustrative implementations. For purposes of explanation, numerous specific details were set forth in order to provide an understanding of various implementations of the inventive subject matter. It will be evident, however, to those skilled in the art that implementations of the inventive subject matter may be practiced without these specific details. In general, well-known instruction instances, protocols, structures and techniques have not been shown in detail.

The foregoing description, for purpose of explanation, has been described with reference to specific implementations. However, the illustrative discussions above are not intended to be exhaustive or to limit the implementations to the precise forms disclosed. Many modifications and variations are possible in view of the above teachings. The implementations were chosen and described in order to best explain the principles and their practical applications, to thereby enable others skilled in the art to best utilize the implementations and various implementations with various modifications as are suited to the particular use contemplated.

What is claimed is:

1. A computing system comprising one or more processors and a memory, the memory storing one or more programs for execution by the one or more processors, the one or more programs singularly or collectively comprising instructions for executing a method comprising:
   identifying one or more nodes to satisfy at least a subset of a composite hardware requirement for a plurality of jobs in a queue, wherein each respective job in the plurality of jobs is timestamped to indicate when the respective job was submitted to the queue and specifies one or more node resource requirements, wherein the composite hardware requirement is based upon one or more node resource requirements of each job in the plurality of pending jobs, and wherein the identifying comprises:
   (i) determining a current availability score for each respective node class in a plurality of node classes, and
   (ii) reserving one or more nodes of a first node class in the plurality of node classes when a demand score for the first node class satisfies the current availability score for the corresponding node class by a first threshold amount; and
   granting each respective node in the one or more nodes with a draw privilege, wherein the draw privilege permits a distributed computing module of a respective node to draw one or more jobs from the plurality of jobs subject to a constraint that the collective hardware requirements of the one or more jobs collectively drawn by the respective node does not exceed the hardware resources of the respective node, and wherein the respective node identifies the one or more jobs by scanning the plurality of jobs in accordance with the draw privilege.

2. The computing system of claim 1, wherein each respective job in the plurality of jobs is associated with an originating user identifier, and wherein the method further comprises associating the originating user of a first job in the plurality of jobs with all or a portion of the current availability score of the node class of the respective node that draws the first job in the plurality of jobs.

3. The computing system of claim 1, wherein the demand score for the first node class is determined by:
   (i) a number of reservable processing cores of the first node class, and
   (ii) a reservable memory capability of the first node class.

4. The computing system of claim 3, wherein the demand score for the first node class is further determined by a processor performance of a reservable processing core of the first node class.

5. The computing system of claim 1, wherein at least one node in the one or more nodes is a virtual machine.

6. The computing system of claim 1, the method further comprising:
   rank ordering the plurality of node classes prior to the reserving (ii) by determining a respective effective availability score for each respective node class in the plurality of node classes using:
   (a) the current availability score for the respective node class,
   (b) a reservable number of processing cores for the respective node class, and
   (c) a likelihood of usefulness of the respective node class, wherein the likelihood of usefulness is determined by a difference in the current availability score and a demand score for the respective node class,
   thereby rank ordering the plurality of node classes into a rank order; and
   identifying the first node class from among the plurality of node classes using the rank order of the plurality of node classes.

7. The computing system of claim 1, wherein a job in the plurality of jobs comprises a container.

8. The computing system of claim 1, wherein a job in the plurality of jobs comprises a process.

9. The computing system of claim 1, wherein the method further comprises writing a job definition file in a pending jobs directory for each respective job in the queue.

10. The computing system of claim 9, wherein the method further comprises:
    creating a respective host directory for each respective node in the one or more nodes thereby creating one or more host directories, writing a corresponding node status file in the corresponding host directory for each respective node in the one or more nodes, updating a status of each respective node in the one or more nodes by updating the node status file corresponding to the respective node based upon a status received from the respective node; and moving the job definition file of a job in the queue from the pending jobs directory to the host directory corresponding to a respective node in the one or more nodes when the respective node draws the job from the queue.

11. The computing system of claim 10, wherein the method further comprises:
running a node clean-up process comprising:
checking a status of each node in the one or more nodes by reading each host configuration in each host directory in the one or more host directories on a recurring basis; and
responsive to determining that a respective node in the one or more nodes has failed to update its status in the host configuration file corresponding to the respective node within a first time-out period, moving the job definition file of each respective job that is in the host directory corresponding to the respective node back into the pending jobs directory thereby adding each said respective job back to the queue.

12. The computing system of claim 1, wherein the distributed computing module executes a procedure comprising scanning the queue in accordance with the draw privilege, thereby identifying the one or more jobs from the queue.

13. The computing system of claim 1, wherein the distributed computing module is installed on the respective node as an image, and wherein the image further comprises an operating system that is executed by the respective node.

14. The computing system of claim 13, wherein the image further comprises instructions for acquiring, from a remote location, one or more programs required to run all or a portion of a job in the plurality of jobs.

15. A non-transitory computer readable storage medium stored on a computing device, the computing device comprising one or more processors and a memory, the memory storing one or more programs for execution by the one or more processors, wherein the one or more programs singularly or collectively comprise instructions for executing a method comprising:
identifying one or more nodes to satisfy at least a subset of a composite hardware requirement for a plurality of jobs in a queue, wherein each respective job in the plurality of jobs is timestamped to indicate when the respective job was submitted to the queue and specifies one or more node resource requirements, wherein the composite hardware requirement is based upon one or more node resource requirements of each job in the plurality of pending jobs, and wherein the identifying comprises:
(i) determining a current availability score for each respective node class in a plurality of node classes, and
(ii) reserving one or more nodes of a first node class in the plurality of node classes when a demand score for the first node class satisfies the current availability score for the corresponding node class by a first threshold amount; and
granting each respective node in the one or more nodes with a draw privilege, wherein the draw privilege permits a distributed computing module of a respective node to draw one or more jobs from the plurality of jobs subject to a constraint that the collective hardware requirements of the one or more jobs collectively drawn by the respective node does not exceed the hardware resources of the respective node, and wherein the respective node identifies the one or more jobs by scanning the plurality of jobs in accordance with the draw privilege.

16. The non-transitory computer readable storage medium of claim 15 wherein the one or more nodes is a plurality of nodes.

17. The non-transitory computer readable storage medium of claim 15 wherein at least one node in the one or more nodes is a virtual machine.

18. The non-transitory computer readable storage medium of claim 15, wherein the distributed computing module is installed on the respective node as an image, and wherein the image further comprises an operating system that is executed by the respective node.

19. A method comprising:
identifying one or more nodes to satisfy at least a subset of a composite hardware requirement for a plurality of jobs in a queue, wherein each respective job in the plurality of jobs is timestamped to indicate when the respective job was submitted to the queue and specifies one or more node resource requirements, wherein the composite hardware requirement is based upon one or more node resource requirements of each job in the plurality of pending jobs, and wherein the identifying comprises:
(i) determining a current availability score for each respective node class in a plurality of node classes, and
(ii) reserving one or more nodes of a first node class in the plurality of node classes when a demand score for the first node class satisfies the current availability score for the corresponding node class by a first threshold amount; and
granting each respective node in the one or more nodes with a draw privilege, wherein the draw privilege permits a distributed computing module of a respective node to draw one or more jobs from the plurality of jobs subject to a constraint that the collective hardware requirements of the one or more jobs collectively drawn by the respective node does not exceed the hardware resources of the respective node, and wherein the respective node identifies the one or more jobs by scanning the plurality of jobs in accordance with the draw privilege.

20. The method of claim 19, wherein the one or more nodes comprises a plurality of nodes.

* * * * *